United States Patent
Grigoryan et al.

(10) Patent No.: US 10,491,454 B2
(45) Date of Patent: Nov. 26, 2019

(54) METHODS AND SYSTEMS TO DIAGNOSE ANOMALIES IN CLOUD INFRASTRUCTURES

(71) Applicant: VMware, Inc., Palo Alto, CA (US)

(72) Inventors: Naira Movses Grigoryan, Yerevan (AM); Arnak Poghosyan, Yerevan (AM); Ashot Nshan Harutyunyan, Yerevan (AM); Mazda A. Marvasti, Coto de Caza, CA (US)

(73) Assignee: VMware, Inc., Palo Alto, CA (US)

( * ) Notice: Subject to any disclaimer, the term of this patent is extended or adjusted under 35 U.S.C. 154(b) by 362 days.

(21) Appl. No.: 15/172,616

(22) Filed: Jun. 3, 2016

(65) Prior Publication Data

US 2017/0353345 A1    Dec. 7, 2017

(51) Int. Cl.
*G06F 13/00* (2006.01)
*H04L 12/24* (2006.01)
*H04L 29/08* (2006.01)

(52) U.S. Cl.
CPC ........ *H04L 41/064* (2013.01); *H04L 41/0677* (2013.01); *H04L 41/142* (2013.01); *H04L 67/10* (2013.01)

(58) Field of Classification Search
CPC ... H04L 29/08072; H04L 29/06; H04L 43/00; H04L 12/2602; H04L 41/22; H04L 41/064; H04L 41/142; H04L 41/0677; H04L 67/10; G06F 13/00
USPC .......................................................... 709/224
See application file for complete search history.

(56) References Cited

U.S. PATENT DOCUMENTS

| | | | | |
|---|---|---|---|---|
| 7,233,843 B2* | 6/2007 | Budhraja | ................ | H02J 3/008 700/291 |
| 8,060,259 B2* | 11/2011 | Budhraja | ................ | H02J 3/008 700/291 |
| 8,401,710 B2* | 3/2013 | Budhraja | ................ | H02J 3/008 700/291 |
| 8,751,867 B2 | 6/2014 | Marvasti et al. | | |
| 2010/0100768 A1* | 4/2010 | Yamamoto | ............ | H04L 41/044 714/32 |
| 2015/0229661 A1* | 8/2015 | Balabine | ............. | H04L 63/1425 726/22 |
| 2015/0304346 A1* | 10/2015 | Kim | .................... | H04L 63/1408 726/23 |

* cited by examiner

*Primary Examiner* — Robert B Harrell

(57) ABSTRACT

A problem in a cloud infrastructure may be identified when a server computer deviates from a normal level of operation based on anomaly scores, which generates an alert and an alert time that indicates when the alert is generated. Methods then determine which virtual machine ("VM") and other IT objects/resources or their pools contribute to the problem within a time window surrounding the estimated problem start time and calculate which objects show similar, related anomalous behavior. Methods also generate ranked remediation recommendations on an object level and server computer-to-object level. The methods generate results that enable a system administrator to identify the start time of the problem and identify the objects that are responsible for the problem.

27 Claims, 28 Drawing Sheets

Table I: Child-to-child correlations for problem interval.

| Child_i | Child_j | Correlation |
|---|---|---|
| Hovo | ControllerListener | 0.800042204 |
| Hovo | VC-10-monitor | 0.768732342 |
| Hovo | WorkSpace | 0.747868911 |
| Hovo | platform:Platform@123 | 0.68633782 |
| VC-10-monitor | ControllerListener | 0.617672339 |
| VC-10-monitor | platform:Platform@123 | 0.589783024 |
| WorkSpace | platform:Platform@123 | 0.483308558 |
| platform:Platform@123 | ControllerListener | 0.46005844 |
| VC-10-monitor | WorkSpace | 0.343905506 |
| WorkSpace | ControllerListener | 0.260976007 |
| VC-10-monitor | datastore-67 | 0.213552095 |
| datastore-67 | ControllerListener | 0.064776595 |
| Hovo | datastore-67 | 0.042413764 |
| platform:Platform@123 | datastore-67 | -0.017645905 |
| WorkSpace | datastore-67 | -0.097334522 |

FIG. 19G

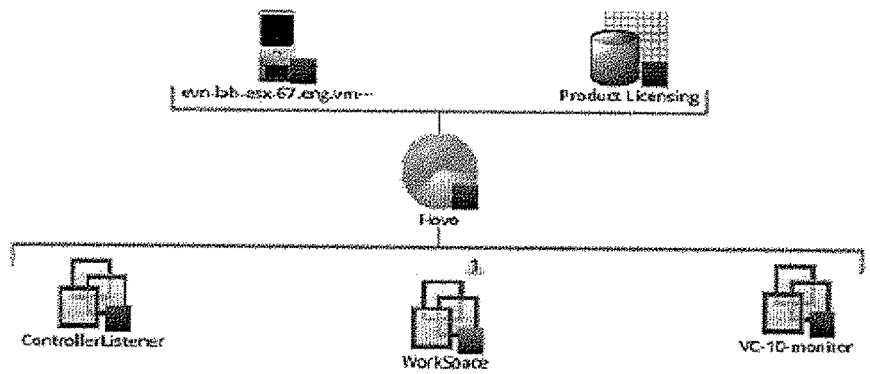

FIG. 19H

Table II: Child-to-child historic correlations.

| Child_i | Child_j | Correlation |
|---|---|---|
| Hovo | VC-10-monitor | 0.794929119 |
| WorkSpace | platform:Platform@123 | 0.66130814 |
| Hovo | datastore-67 | 0.646497645 |
| Hovo | platform:Platform@123 | 0.611090019 |
| VC-10-monitor | datastore-67 | 0.538547917 |
| platform:Platform@123 | datastore-67 | 0.529359378 |
| WorkSpace | datastore-67 | 0.456193616 |
| Hovo | WorkSpace | 0.451767778 |
| Vanik | datastore-67 | 0.396047118 |
| Ashot | ControllerListener | 0.370706249 |
| Vanik | platform:Platform@123 | 0.347556821 |
| NFS-DS-Do-Not-Use-For-Deployment | Vanik | 0.317771384 |
| Hovo | Vanik | 0.291026497 |
| VC-10-monitor | Ashot | -0.384532661 |
| Hovo | Ashot | -0.391295637 |

FIG. 19I

METHODS AND SYSTEMS TO DIAGNOSE ANOMALIES IN CLOUD INFRASTRUCTURES

TECHNICAL FIELD

The present disclosure is directed to methods and systems of detecting anomalies in cloud infrastructures.

BACKGROUND

In recent years, cloud computing has emerged as a preferred place for organizations to deploy their applications, store data, and enable remotely located employees and customers to access applications and data storage via the Internet. Cloud computing has also enabled independent cloud computing provides to sell cloud computing services, which enables organizations that purchase these services to decrease time to market while eliminating a heavy investment in information technology ("IT") resources and operating expenses. For example, organizations that choose to run their applications and store data in a cloud computing infrastructure maintained by a cloud computing provider may scale resources according to changing computing and data storage demands and reduce costs by paying only for the resources and workloads they use.

Physical and virtual cloud computing resources are typically monitored to determine how certain resources perform with respect to different operations. The physical resources include server computers, data-storage devices, networks, and load balancers, and the virtual resources include virtual machines ("VMs"), virtual data-storage devices, and virtual resource pools, such as a specific combination of VMs and virtual data-storage devices. Each resource generates one or more metrics that indicate how often, or how much of, the resource is used over time. For example, typical metrics collected over time include number of buffer accesses, physical and virtual CPU usage, physical and virtual memory usage, physical and virtual data-storage availability, and electrical power consumption. After multiple metrics have been collected, the metrics may be evaluated to assess and track resource performance. Of particular interest to system administrator is the ability to identify anomalies that occur within the cloud infrastructure based on the metrics. When a metric exceeds or falls below an associated threshold, an alert is typically generated. However, the system administrator may not be able to identify when the problem started and identify which resource is, or group of resources are, responsible for the problem in order to isolate and terminate the resource or group of resources before catastrophic problems occur. For example, a metric associated with a server computer that violates a threshold may be a good indicator of server computer failure, slowdown, and other problems with the server computer. However, the system administrator does not know if the problem is with the server computer itself or is a problem created by one or more of the VMs running on the server computer.

SUMMARY

A problem in a cloud infrastructure may be identified when a server computer deviates from a normal level of operation, which generates an alert and an alert time that indicates when the alert is generated. Based on the alert time, methods determine a more accurate estimate of a start time of the problem. Methods then determine which virtual machine ("VM") and other IT objects/resources or their pools contribute to the problem within a time window surrounding the estimated problem start time and calculate which objects show similar, related anomalous behavior. Method also generate ranked remediation recommendations on an object level and server computer-to-object level. The methods generate results that enable a system administrator to identify the start time of the problem and identify the objects that are responsible for the problem.

DESCRIPTION OF THE DRAWINGS

FIGS. 19A-19L show experimental results for a prototype.

DETAILED DESCRIPTION

Cloud-computing facilities provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 1:
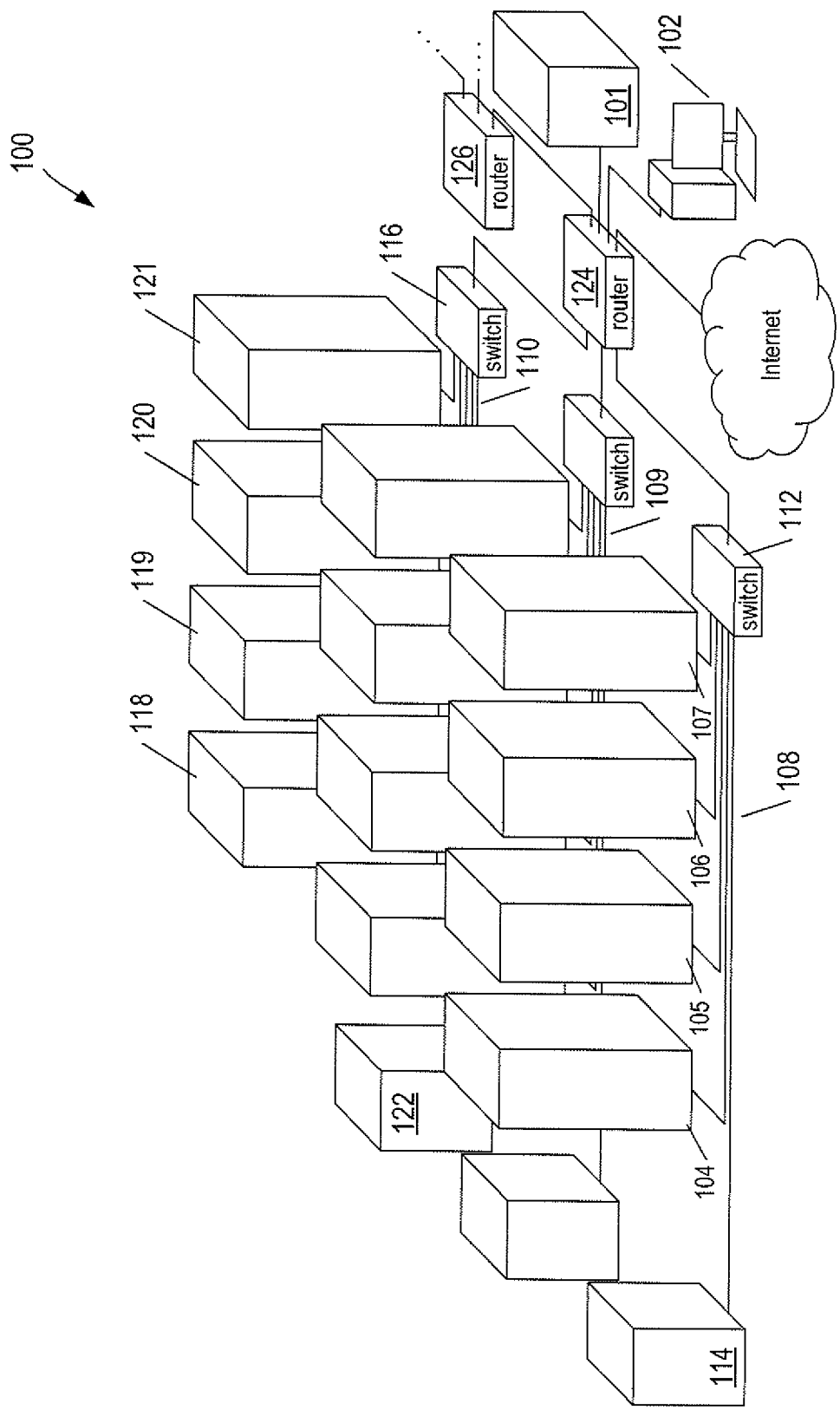
FIG. 1 shows an example of a cloud-computing facility.

FIG. 1 shows an example of a cloud-computing facility 100. The cloud-computing facility 100 consists of a virtual-data-center management server 101 and a PC 102 on which a virtual-data-center management interface may be displayed to system administrators and other users. The cloud-computing facility 100 additionally includes a number of hosts or server computers, such as server computers 104-107, that are interconnected to form three local area networks 108-110. For example, local area network 108 includes a switch 112 that interconnects the four servers 104-107 and a mass-storage array 114 via Ethernet or optical cables and local area network 110 includes a switch 116 that interconnects four servers 118-1121 and a mass-storage array 122 via Ethernet or optical cables. In this example, the cloud computing infrastructure 100 also includes a router 124 that interconnects the LANs 108-110 and interconnects the LANS to the Internet, the virtual-data-center management server 101, the PC 102 and to a router 126 that, in turn, interconnects other LANs composed of server computers and mass-storage arrays (not shown). In other words, the routers 124 and 126 are interconnected to form a larger network of server computers.

Figure 2:
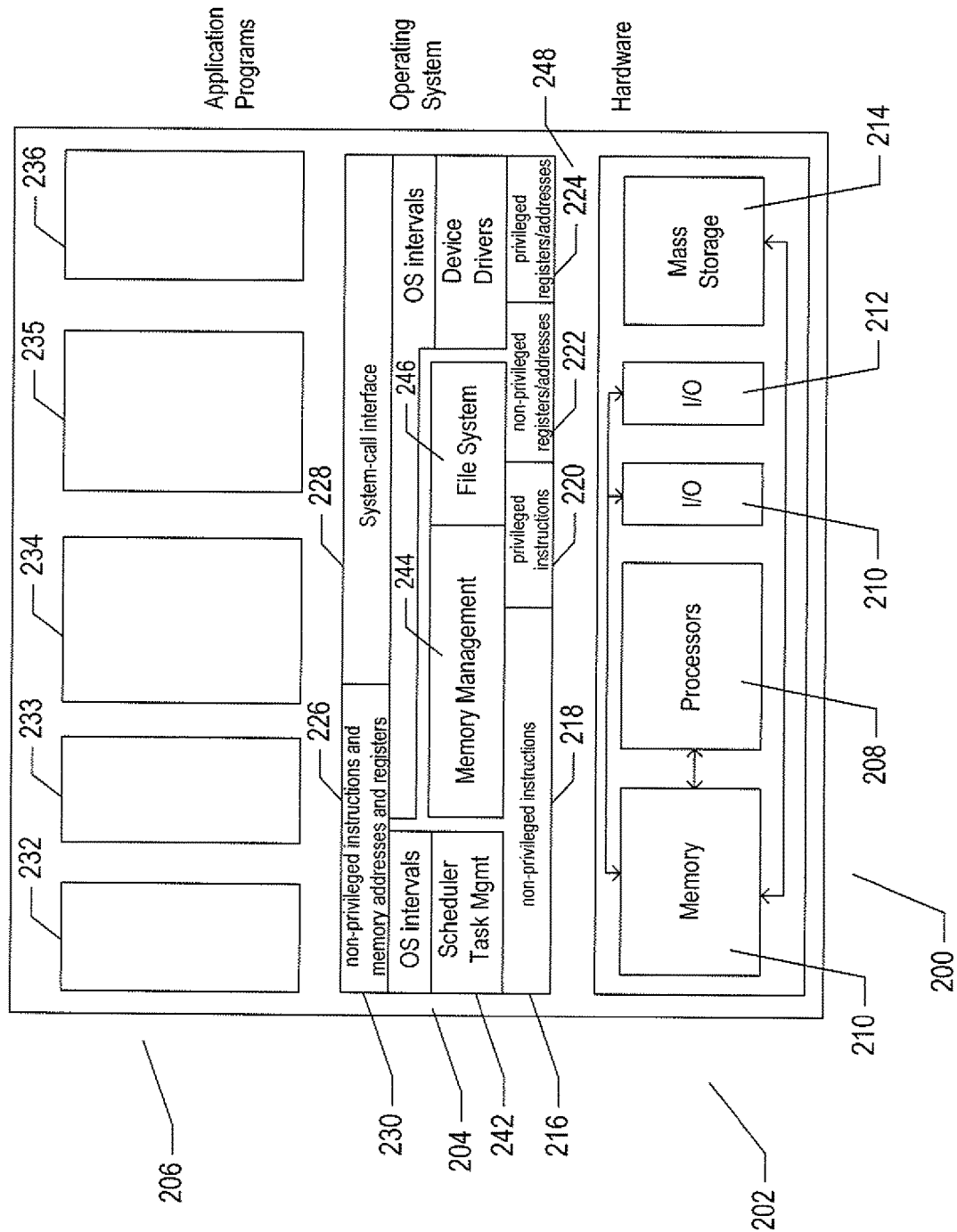
FIG. 2 shows generalized hardware and software components of a server computer.

FIG. 2 shows generalized hardware and software components of a server computer. The server computer 200 includes three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged computer instructions 218, a set of privileged computer instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 246 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3A:
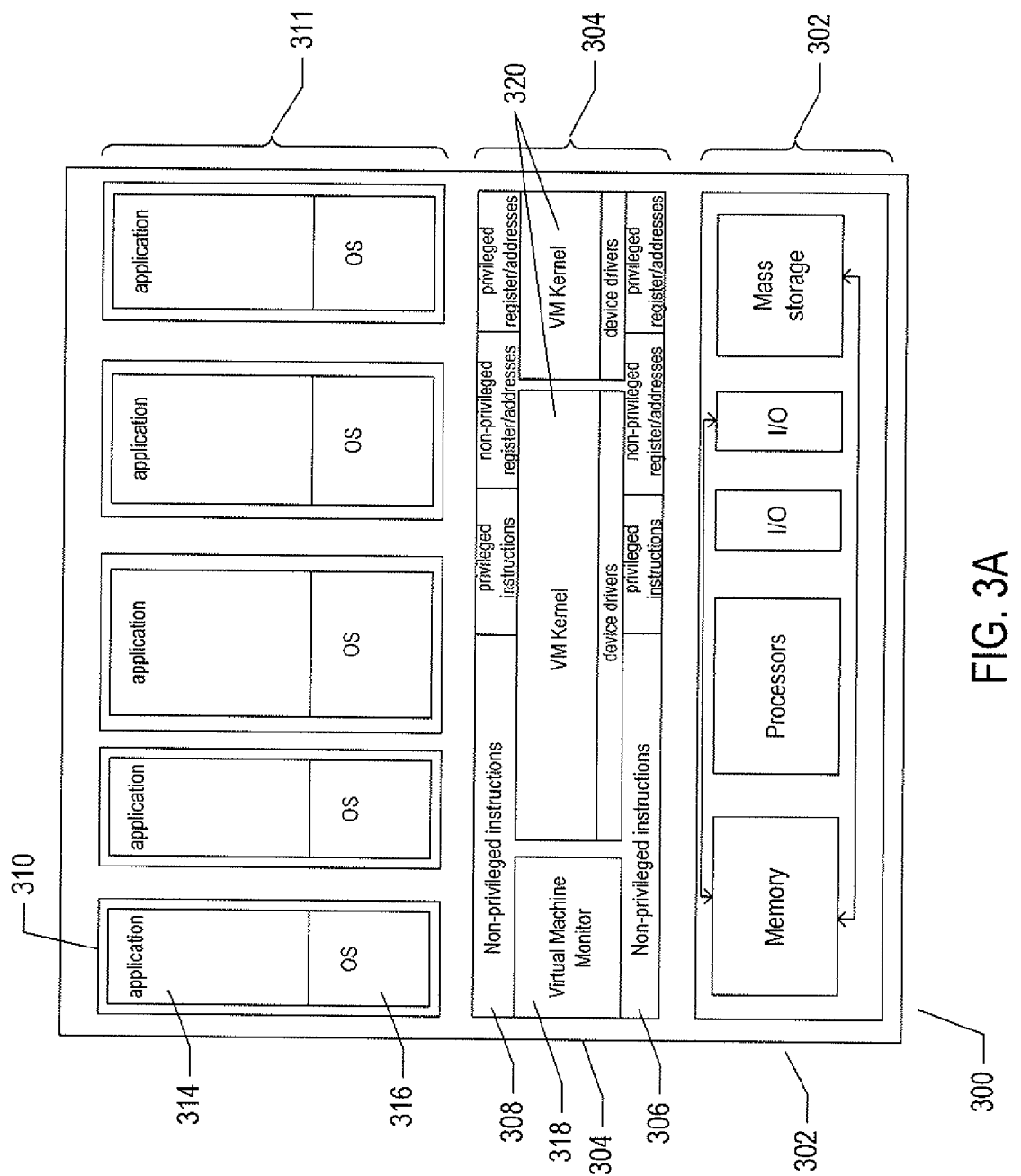
FIGS. 3A-3B show two types of virtual machines and virtual-machine execution environments.
Figure 3B:
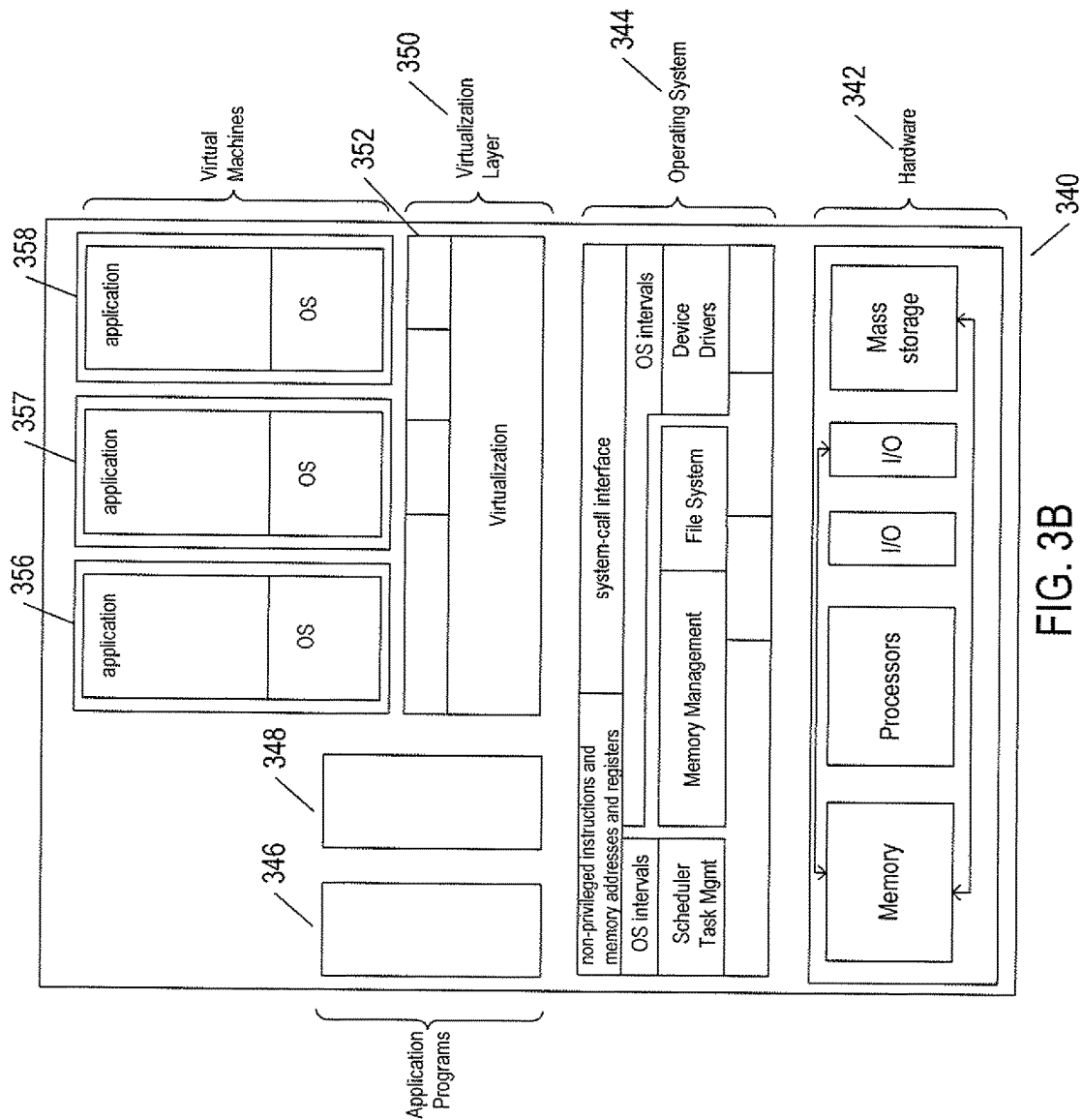

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 3A-3B show two types of VM and virtual-machine execution environments. FIGS. 3A-3B use the same illustration conventions as used in FIG. 2. FIG. 3A shows a first type of virtualization. The server computer 300 in FIG. 3A includes the same hardware layer 302 as the hardware layer 202 shown in FIG. 2. However, rather than providing an operating system layer directly above the hardware layer, as in FIG. 2, the virtualized computing environment shown in FIG. 3A features a virtualization layer 304 that interfaces through a virtualization-layer/hardware-layer interface 306, equivalent to interface 216 in FIG. 2, to the hardware. The virtualization layer 304 provides a hardware-like interface 308 to a number of VMs, such as VM 310, in a virtual-machine layer 311 executing above the virtualization layer 304. Each VM includes one or more application programs or other higher-level computational entities packaged together with an operating system, referred to as a "guest operating system," such as application 314 and guest operating system 316 packaged together within VM 310. Each VM is thus equivalent to the operating-system layer 204 and application-program layer 206 in the general-purpose computer system shown in FIG. 2. Each guest operating system within a VM interfaces to the virtualization-layer interface 308 rather than to the actual hardware interface 306. The virtualization layer 304 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 304 ensures that each of the VMs currently executing within the virtual environment receive a fair allocation of underlying hardware devices and that all VMs receive sufficient devices to progress in execution. The virtualization-layer interface 308 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 304 includes a virtual-machine-monitor module 318 that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 308, the accesses result in execution of virtualization-layer code to simulate or emulate the privileged devices. The virtualization layer additionally includes a kernel module 320 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 304 essentially schedules execution of VMs much like an operating system schedules execution of application programs, so that the VMs each execute within a complete and fully functional virtual hardware layer.

FIG. 3B shows a second type of virtualization. In FIG. 3B, the server computer 340 includes the same hardware layer 342 and operating system layer 344 as the hardware layer 202 and the operating system layer 204 shown in FIG. 2. Several application programs 346 and 348 are shown running in the execution environment provided by the operating system 344. In addition, a virtualization layer 350 is also provided, in computer 340, but, unlike the virtualization layer 304 discussed with reference to FIG. 3A, virtualization layer 350 is layered above the operating system 344, referred to as the "host OS," and uses the operating system interface to access operating-system-provided functionality as well as the hardware. The virtualization layer 350 comprises primarily a VMM and a hardware-like interface 352, similar to hardware-like interface 308 in FIG. 3A. The virtualization-layer/hardware-layer interface 352, equivalent to interface 216 in FIG. 2, provides an execution environment for a number of VMs 356-358, each including one or more application programs or other higher-level computational entities packaged together with a guest operating system.

In FIGS. 3A-3B, the layers are somewhat simplified for clarity of illustration. For example, portions of the virtualization layer 350 may reside within the host-operating-system kernel, such as a specialized driver incorporated into the host operating system to facilitate hardware access by the virtualization layer.

Figure 4:
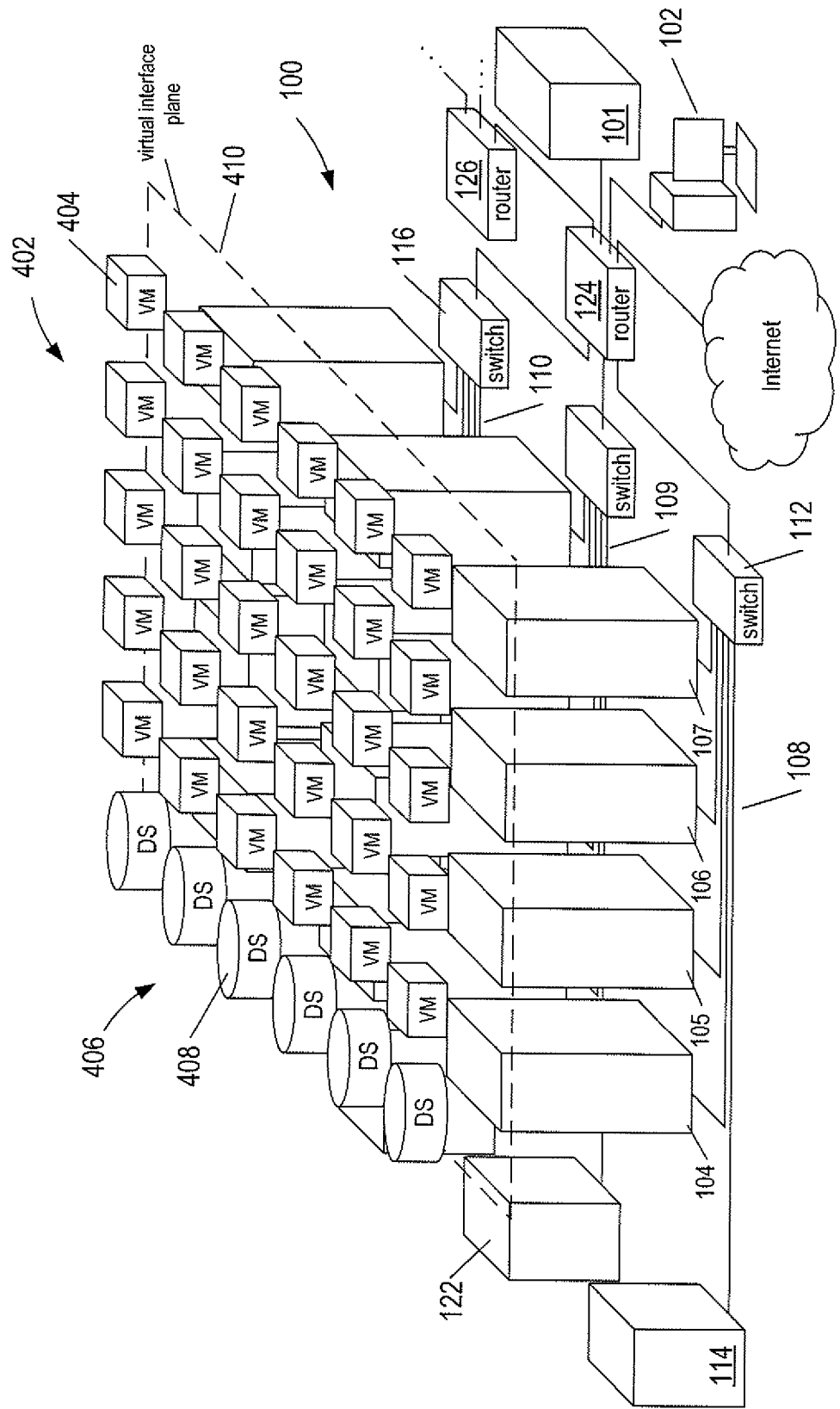
FIG. 4 shows an example set of thirty and datastores above a virtual interface plane in a cloud-computing facility.

FIG. 4 shows an example set of thirty VMs 402, such as VM 404, and set of datastore ("DS") 406, such as DS 408, above a virtual interface plane 410. The virtual interface plane 410 represents a separation between a physical resource level that comprises the server computers and mass-data storage arrays and a virtual resource level that comprises the VMs and DSs. The set of VMs 404 may be partitioned to run on different server computers, and the set of DSs 406 may be partitioned on different mass-storage arrays. Because the VMs are not bound physical devices, the VMs may be moved to different server computers in an attempt to maximize efficient use of the cloud-computing infrastructure 100 resources. For example, each of the server computers 104-107 may initially run three VMs. However, because the VMs have different workloads and storage requirements, the VMs may be moved to other server computers with available data storage and computational resources. Certain VMs may also be grouped into resource pools. For example, suppose a host is used to run five VMs and a first department of an organization uses three of the VMs and a second department of the same organization uses two of the VMs. Because the second department needs larger amounts of CPU and memory, a systems administrator may create one resource pool that comprises the three VMs used by the first department and a second resource pool that comprises the two VMs used by the second department. The second resource pool may be allocated more CPU and memory to meet the larger demands.

In the following description, the terms is "parent" and "child" are used to describe a tiered relationship between cloud infrastructure resources. The term parent refers to a server computer or host. The term "child" refers to an individual virtual resource, such as a VM, DS, or virtual object that runs in the virtualization layer. The term "children" refers to any two or more of the VMs, DSs, or other virtual objects. The children within the same tier are considered peers. The term child may also be used to refer to a resource pool formed from a number of VMs.

Methods now described evaluate parent to child relations when the performance of the parent has deteriorated. Methods also evaluate peer-to-peer correlations between the children. The parent and each child generates an anomaly score. In certain embodiments, an anomaly score may be calculated as the sum of the number of metrics. In other embodiments, the anomaly score may be calculated as a sum of key performance indicator ("KPI") metrics, excluding the non-KPI metrics. In other embodiments, the anomaly score may be calculated as a weighted sum of the KPI metrics in certain KPI metrics are given more weight than other KPI metrics.

An anomaly-score threshold may be used to evaluate the performance of the parent and generate an alert when the behavior of the parent has deteriorated. An anomaly score of a parent that is below the anomaly-score threshold may be used as an indication that the parent exhibits normal behavior. An anomaly score of a parent that exceeds the anomaly-score threshold generates an alert that indicates a problem or at least a situation that requires attention.

Figure 5:
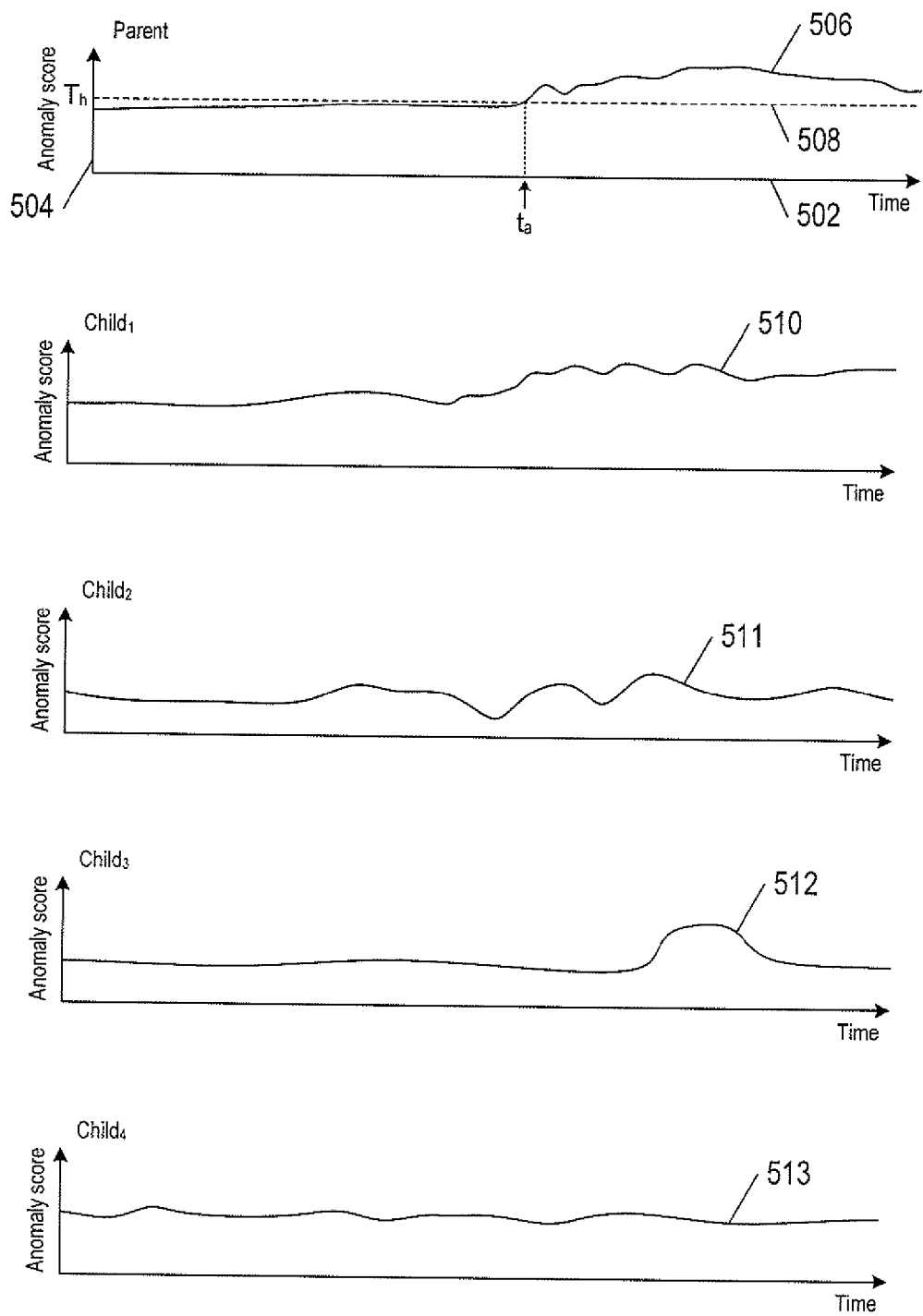
FIG. 5 shows a plot of an anomaly score data for a parent and children associated with the parent.

FIG. 5 shows a plot of an anomaly score for a parent. Horizontal axis 502 represents time. Vertical axis 504 represents the anomaly score. Curve 506 represents the anomaly score of the parent over time. Dashed line 508 represents an anomaly score threshold, $T_h$. The anomaly score of the parent exceeds the threshold $T_h$ at an alert time denoted by $t_a$, which generates an alert indicating that a problem has occurred with the parent. FIG. 5 also shows separate plots of anomaly scores of the children running on the parent. The children are denoted by $Child_1$, $Child_2$, $Child_3$, and $Child_4$. Each plot includes a time axis and an anomaly score axis. Curves 510-513 represent the separate anomaly scores of the children recorded over the same period of time as the anomaly score 506 of the parent. However, it is not clear which child alone, or combination of children, is responsible for the violation of the threshold $T_h$ at the alert time $t_a$.

As shown in the example of FIG. 5, when an alert is generated as a result of a parent anomaly score exceeding the anomaly-score threshold, the following conditions exist: 1) the parent's anomaly score has a positive slope while increasing toward the threshold; and 2) the children may show either negatively or positively sloped anomaly scores around the alert time $t_a$. Methods described below determine which child or children exhibit a change in behavior around the alert time $t_a$ and provide a recommendation list of children to examine for a root cause of the problem.

Although the alert time $t_a$ is an indication of when the anomaly score violated the threshold $T_h$, the actual start time of the problem at the parent may have occurred prior to the alert time $t_a$. Based on the alert time $t_a$ and the anomaly scores of the parent that precede the alert time $t_a$, an estimated problem start time is determined by first determining the maximum slope of parent anomaly scores that precede the alert time $t_a$. The estimated problem start time is calculated from the maximum slope.

Figure 6A:
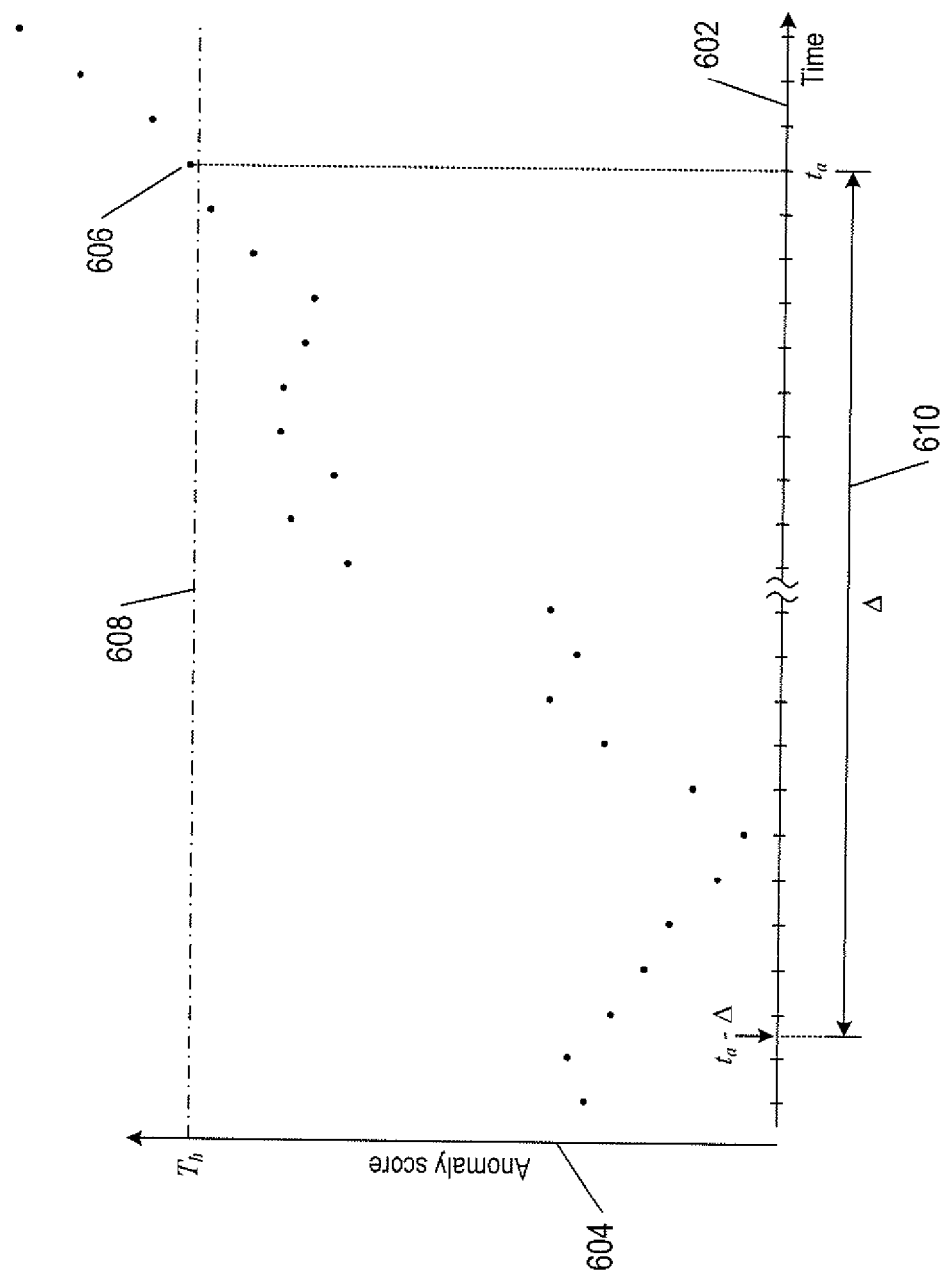
FIGS. 6A-6E show calculation of a maximum slope of anomaly score data.

FIGS. 6A-6E show calculation of a maximum slope of parent anomaly scores that precede the alert time $t_a$. In FIG. 6A, horizontal axis 602 represents time and vertical axis 604 represents anomaly score values. Dots represent anomaly score data $(t_i, y_i)$, where $y_i$ represents an anomaly score recorded at time $t_i$. The times $t_i$ are represented by regularly spaced marks along the time axis 602. FIG. 6A shows an anomaly score data point 606 that exceeds a threshold $T_h$ represented by dot-dash line 608 at alert time $t_a$, which triggers an alert Base on the alert time $t_a$, a time range $[t_a-\Delta, t_a]$ 610 that extends backward in time from the alert time $t_a$ is created, where $\Delta$ is the duration of the time range 610. The duration $\Delta$ of the time range 610 may be any duration greater than or equal to about 60 minutes, such as about 75 minutes, about 90 minutes, about 120 minutes, about 240 minutes, about 360 minutes or larger. A list of times in the time range 610, called the "time list," is generated and represented by:

$$\text{timeList}=\text{data}[t_a-\Delta, t_a] \quad (1)$$

Figure 6B:
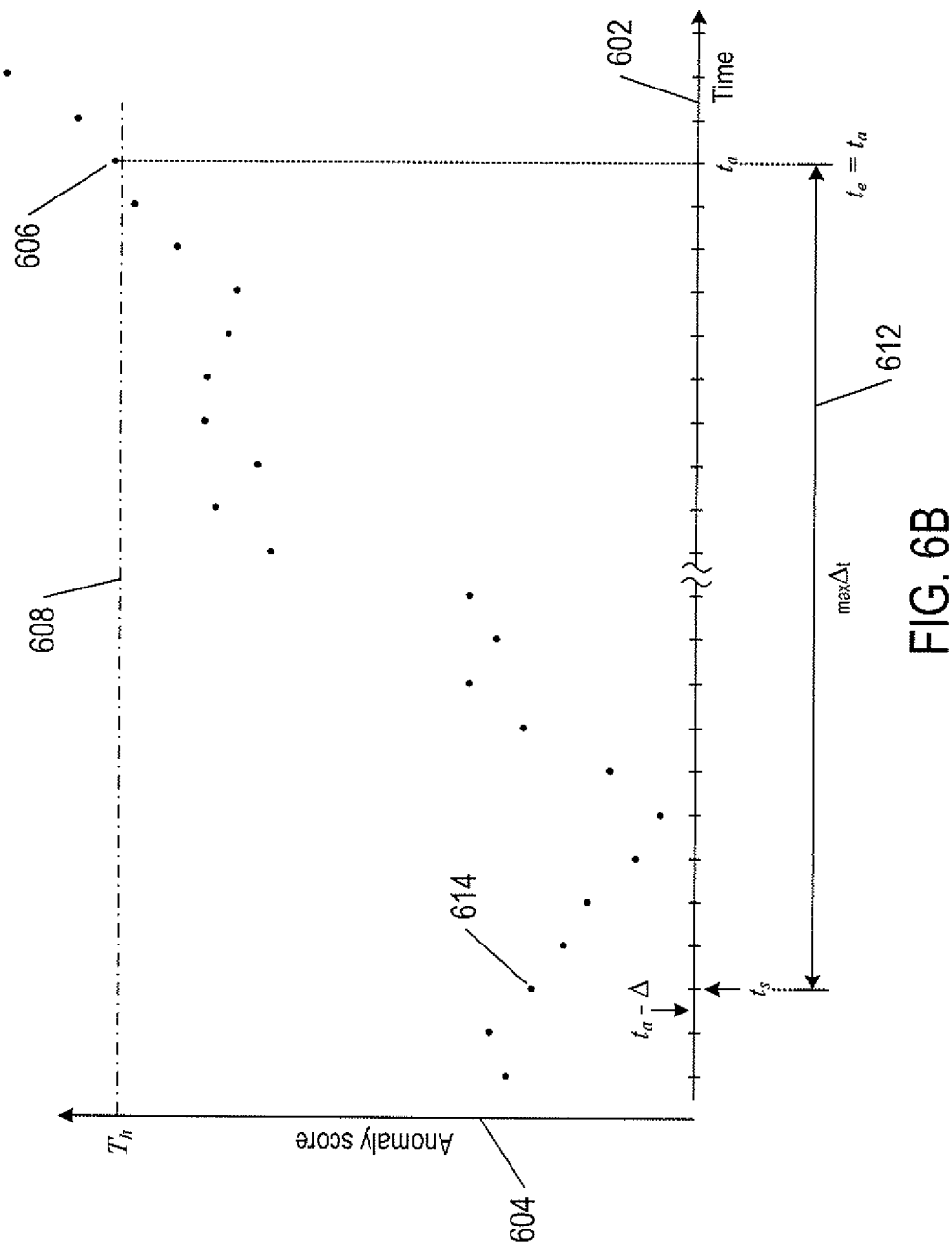

FIG. 6B shows a maximum time window 612 is created with a duration:

$$_{max}\Delta_t = t_e - t_s \quad (2)$$

where
$t_e = t_a$ is the maximum time of the timeList, and
$t_s$ is the minimum time of the timeList, For example, in FIG. 6B, the minimum time $t_s$ is the minimum time at which an anomaly score 614 is recorded in the time range 610. The maximum time window 612 in the time range 610 has minimum time $t_s$ and maximum time $t_e$.

The slope and y-intercept of parent anomaly score data are calculated for each of a number of overlapping time windows of the maximum time window. The time window with the maximum slope is identified. The overlapping time windows are called backward and forward time windows.

Figure 6C:
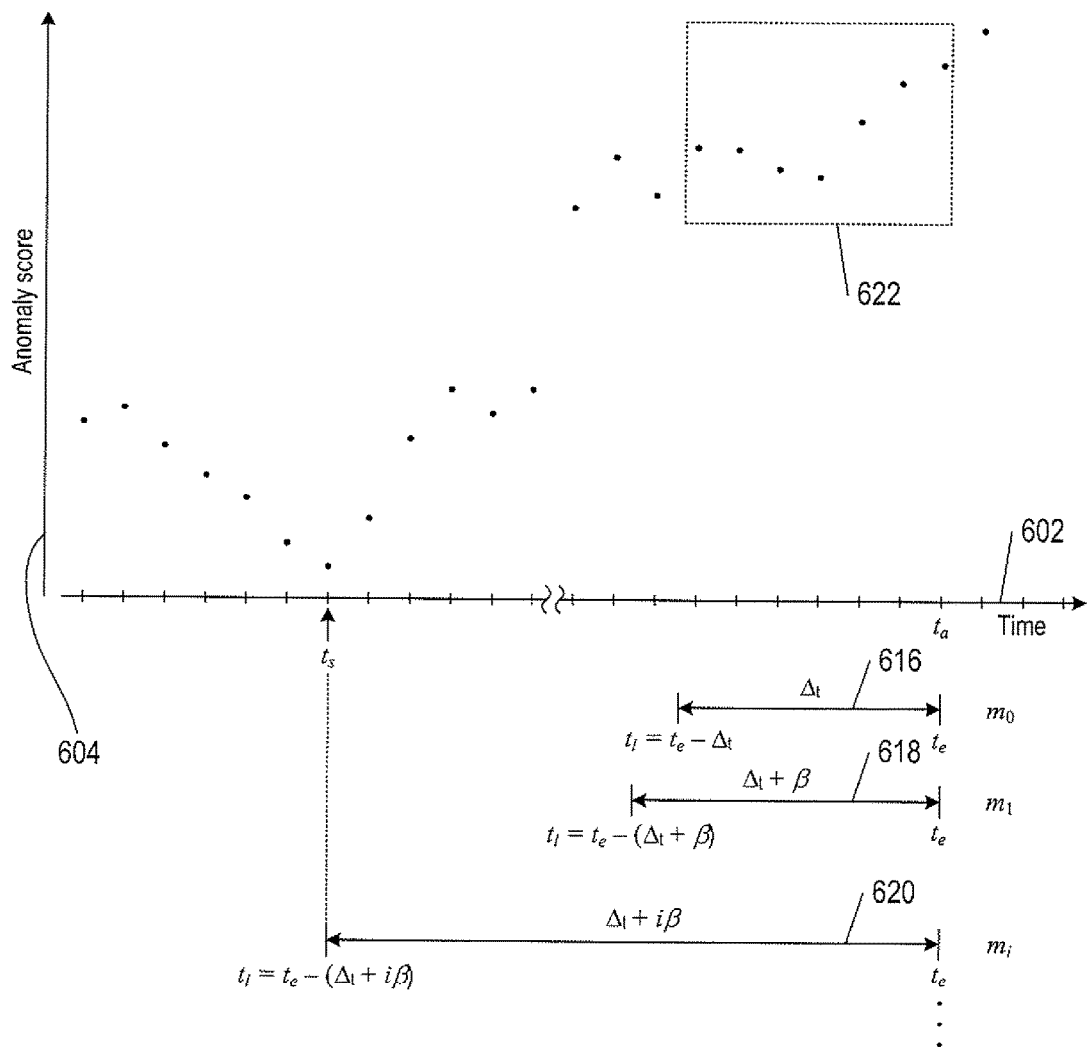

FIG. 6C shows a series of backward time windows 616, 618, and 620 denoted by $[t_l, t_e]$. Each of the backward time windows has the same upper time limit given by the maximum time $t_e$ and a different lower time limit calculated according to $$t_l = t_e - (\Delta_t + i\beta) \quad (3a)$$

where
$\Delta_t$ is an initial time window duration;
$\beta$ is a time window adjustment parameter, and
$i=0, 1, 2, \ldots$ is a backward time window index.

The slope, $m_i$, and y-intercept, $b_i$, of the set of anomaly score data in each of the backward time windows are calculated separately, for $i=0, 1, 2, \ldots$. For example, $m_0$ is the slope and $b_0$ is the y-intercept of the anomaly score data 622 in the time window 616. Calculation stops when $(\Delta_t+i\beta) >_{max}\Delta_t$. The minimum time $t_s$ is set equal to the lower time limit $t_l$ of the backward time window with the largest slope (i.e., $|m_i|$). For example, if $m_l$ is the largest slope of the backward time windows 616, 618, and 620 in FIG. 6C, the minimum time $t_s$ is set equal to the lower time limit $t_l$ of the backward time window 620.

Figure 6D:
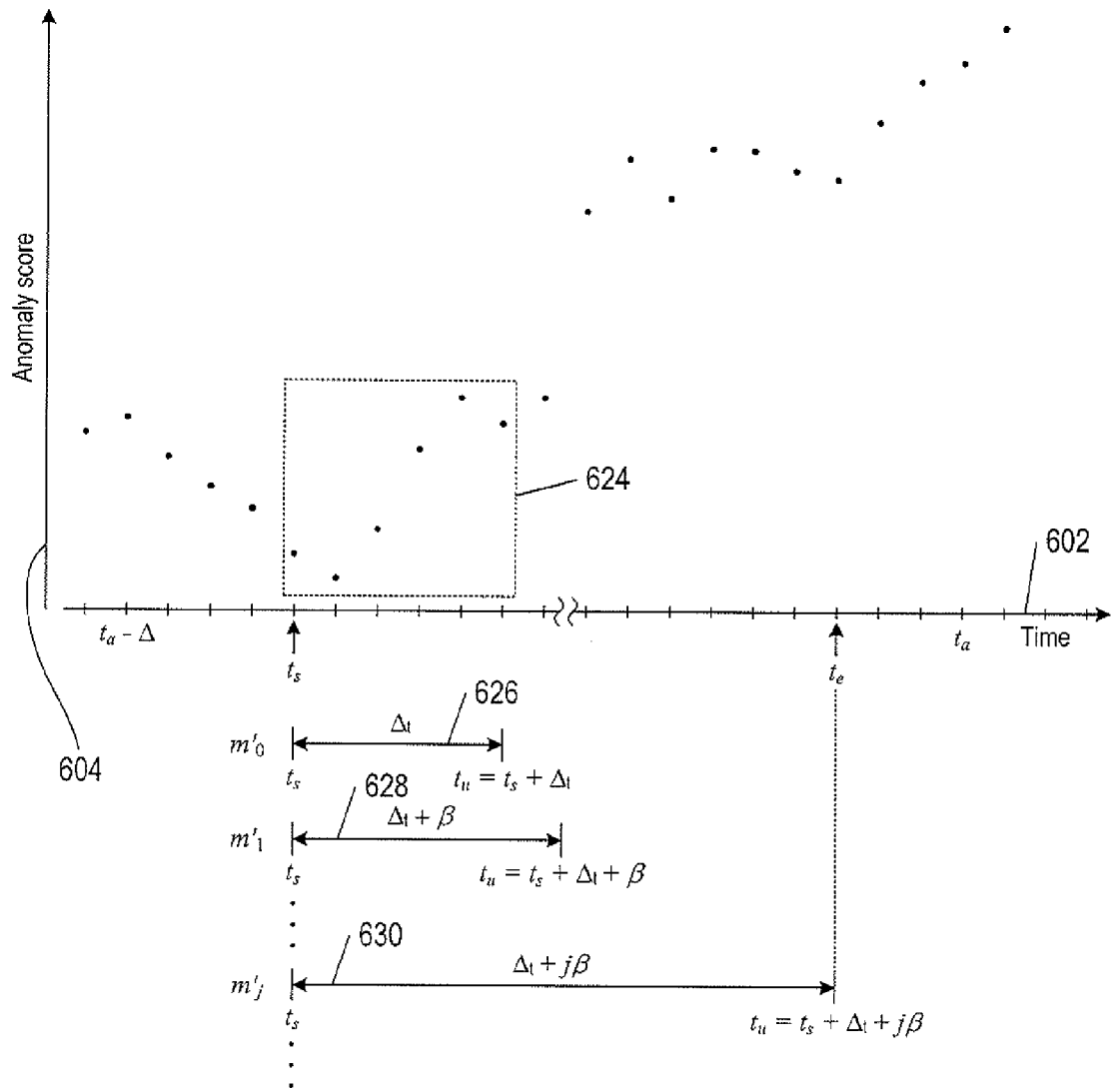

FIG. 6D shows a series of forward time windows 624, 626, and 628 denoted by $[t_s, t_u]$, where $t_s$ is the reset minimum time described above with reference to FIG. 6C. Each of the forward time windows has the same lower time limit $t_s$ and an upper time limit calculated according to $$t_u = t_s + \Delta_t + j\beta \quad (3b)$$

where $j=0, 1, 2, \ldots$ is a time window index.

The slope, $m'_j$, and y-intercept, $b'_j$, of the set of anomaly score data in each of the forward time windows are calculated, for $j=0, 1, 2, \ldots$. For example, $m'_0$ is the slope and $b'_0$ is the y-intercept of the set of anomaly score data 624 in the forward time window 626. Calculation of the slope and y-intercept for each of the forward time windows stops when $t_u > t_a$. The time $t_e$ is set equal to the upper time limit $t_u$ of the forward time window with the largest magnitude slope. For example, if $m'_j$ is the largest slope of the forward time windows 624, 626, and 628, then the time $t_e$ is set equal to the upper time limit $t_u$ of the forward time window 630.

The slope and y-intercept of a set of anomaly score data in a backward or forward time window is calculated by first rescaling the anomaly score data to a common reference frame followed by applying weighted least squares to calculate the slope and y-intercept of the rescaled anomaly score data. Rescaling to a common reference frame includes mapping the data from the time windows into the same coordinate system and normalizing the data between 0 and 1. Let $(\bar{t}_0, \bar{y}_0)$ be an anomaly score data point in a time window with the smallest time $\bar{t}_0$, and let $(\bar{t}_c, \bar{y}_c)$ be an anomaly score data point in the same time window with the largest time $\bar{t}_c$. Rescaling the anomaly score data points $(\bar{t}_i, \bar{y}_i)$ in the time window to a common reference frame may be accomplished by first defining a scaling factor.

$$\bar{y}_M \equiv \begin{cases} \max(\bar{y}_i) & \bar{y}_c = 0 \\ \bar{y}_c & \bar{y}_c \neq 0 \end{cases} \quad (4a)$$

For each anomaly score $\bar{y}_i$ in the sub-time interval, the anomaly score is rescaled by $$y_i \equiv \begin{cases} \dfrac{\bar{y}_i}{\bar{y}_M} & \bar{y}_M \neq 0 \\ \bar{y}_c & \bar{y}_M = 0 \end{cases} \quad (4b)$$

The times $\bar{t}_i$ are rescaled according to $$t_i = C\bar{t}_i \quad (4c)$$

where C is a constant that changes the time units (e.g., C may be used to change the units of time to minutes).

Figure 6E:
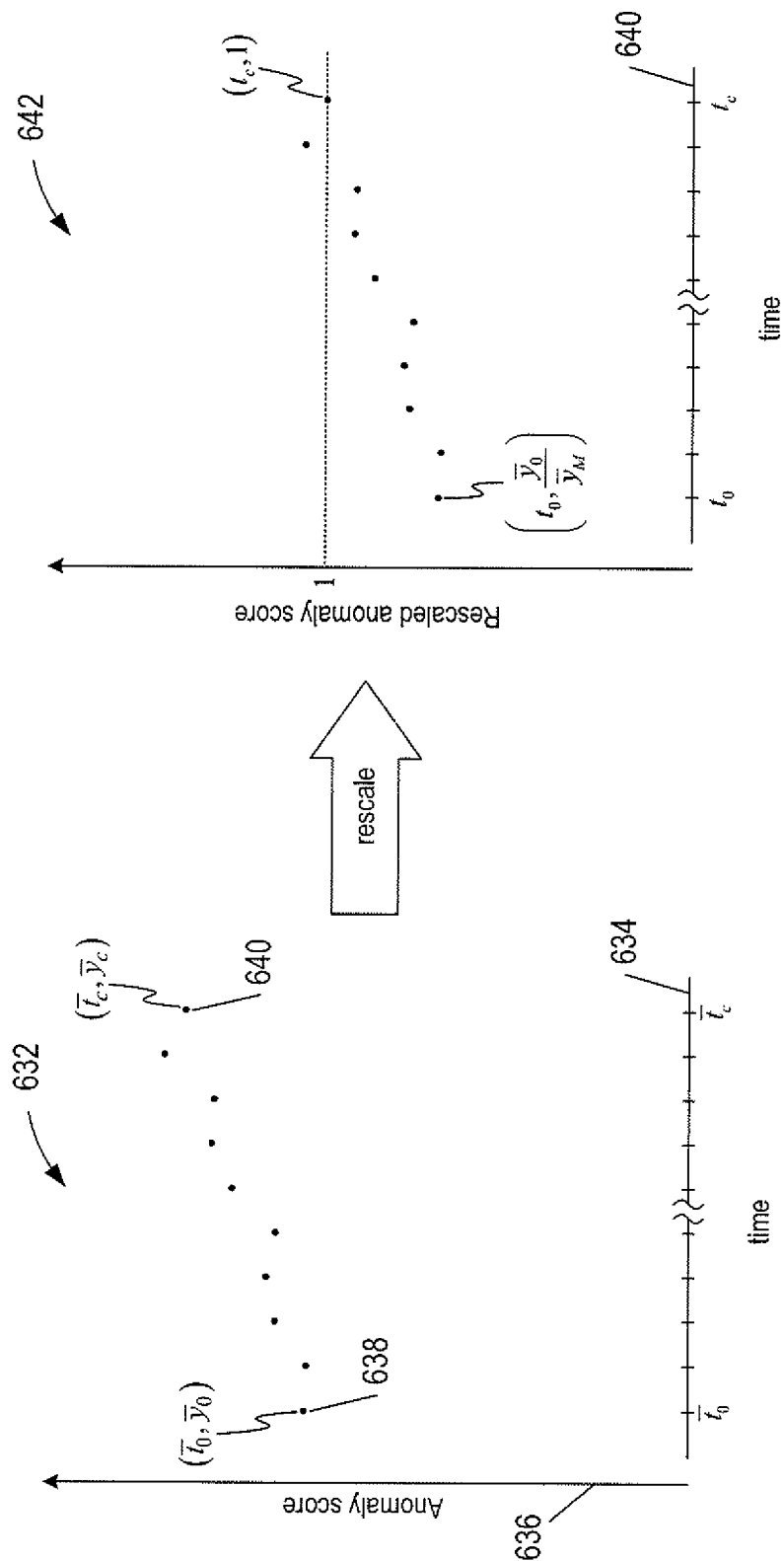

FIG. 6E shows an example of rescaling anomaly score data 632 in a time window $[\bar{t}_0, \bar{t}_c]$. Horizontal axis 634 represents time. Vertical axis 636 represent anomaly score values. Dot 638 represents the anomaly score data point $(\bar{t}_0, \bar{y}_0)$ with the smallest time $\bar{t}_0$. Dot 640 represents the anomaly score data point $(\bar{t}_c, \bar{y}_c)$ with the largest time $\bar{t}_c$. Rescaling the anomaly score data 632 according Equations (4a)-(4c) gives rescaled anomaly score data 642. Because $\bar{y}_c$ does not equal zero, the scaling factor is $\bar{y}_M = \bar{y}_c$, the anomaly scores are rescaled according to Equation (4b), and the associated time coordinates are rescaled according to Equation (4c). The rescaled time window is $[t_0, t_c]$.

Using the following boundary conditions:

$t = t_c$ gives $y = y_c$ $t = t_q$ gives $y = 0$ \quad (5a)

for the linear equation $y(t) = mx + b$, weighted least squares gives the slope of a set of N anomaly score data points in a time window as:

$$m = \frac{y_c}{t_c - t_q} \quad (5b)$$

and the y-intercept:

$$b = y_c - mt_c \quad (5c)$$

In order to calculate the slope in Equation (5b), the time $t_q$ in the denominator is calculated as:

$$t_q = \frac{\sum_{n=1}^{N}(A_n t_n - A_n t_c)}{\sum_{n=1}^{N}(B_n t_c - B_n t_n)} \quad (6a)$$

where $$A_n = w_n^2(y_c t_n - y_n t_c) \quad (6b)$$

$$B_n = w_n^2(y_n - y_c) \quad (6c)$$

and the weight is given by $$w_n = \mu^{ln(n)}; \mu \geq 2 \quad (6d)$$

After the largest slope $m_i$ of the backward time windows and the largest slope $m'_j$ of the forward time window have been determined, the larger of the two slopes is identified as the maximum slope:

$$m_{max} = \max(m_i, m'_j) \quad (7)$$

The maximum slope $m_{max}$ and the corresponding y-intercept b and backward or forward time window are used to calculate a transition time given by:

$$t_T = \begin{cases} \min(t_i) \text{ such that } y(t_i) < y_i & \text{for } m_{max} > 0 \\ \min(t_i) \text{ such that } y(t_i) > y_i & \text{for } m_{max} < 0 \end{cases} \quad (8)$$

where $y(t_i) = m_{max} t_i + b$ is the weighted least-squares line. The transition is an approximation to the estimated start time. When the maximum slope $m_{max}$ of the anomaly score data is positive, the transition time $t_T$ is the minimum time $t_i$ at which the anomaly score data value $y_i$ is less than $y(t_i)$. When the maximum slope $m_{max}$ of the anomaly score data is negative, the transition time $t_T$ is the minimum time $t_i$ at which the anomaly score data value $y_i$ is greater than $y(t_i)$.

Figure 7A:
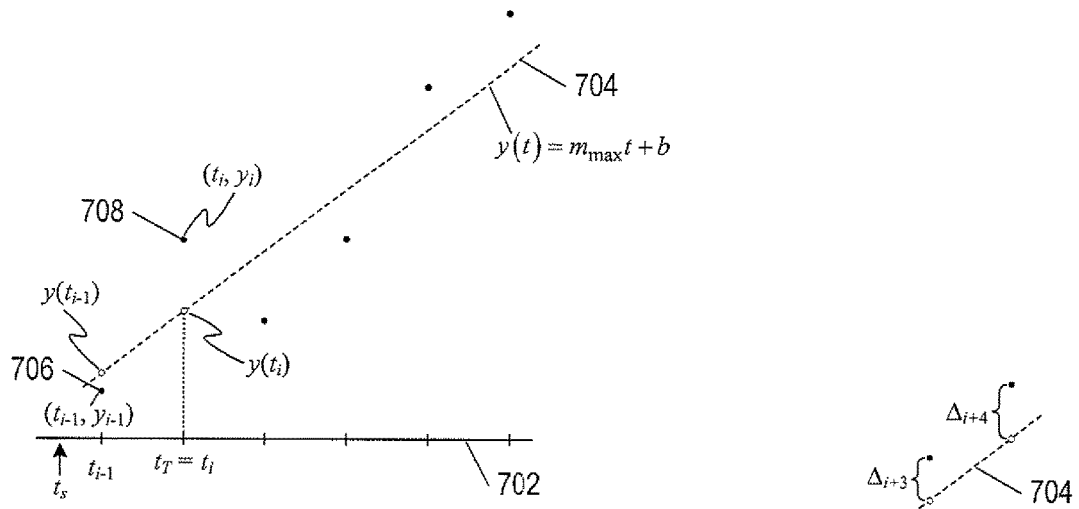
FIG. 7A shows a plot of anomaly score data with a positive slope in a time window.

FIG. 7A shows a plot of anomaly score data close to the reset minimum time $t_s$ of either a backward or forward time window associated with the maximum slope $m_{max}$. Horizontal axis 702 represents time. Dashed line 704 represents a weighted least-squares fit line to the anomaly score data with slope $m_{max}$ and y-intercept b. Dot 706 represents an anomaly score data point $(t_{i-1}, y_{i-1})$ in which $y(t_{i-1})$ is greater than $y_{i-1}$. Dot 708 represents an anomaly score data point $(t_i, y_i)$ in which $y(t_i)$ is less than $y_i$. According to Equation (8), the transition time $t_T$ is set equal to the time $t_i$.

In certain cases, the transition time $t_T$ may not actually correspond to the smallest anomaly data point. In such cases, the transition time $t_T$ may be adjusted to correspond to the anomaly score data point with the largest vertical distance from the weighted least-squares line given by:

$$\Delta_p = \max |y(t_i) - y_i| \text{ for } i \geq T \qquad (9)$$

where $\Delta_i = |y(t_i) - y_i|$ is the vertical distance between anomaly score data point $(t_i, y_i)$ and the weighted least-squares value $y(t_i)$.
The estimated problem start time $t_k$ is selected based on the following conditions:

$$k = \begin{cases} T & \text{when } \Delta_P < \delta \\ P & \text{when } \Delta_P \geq \delta \end{cases} \qquad (10)$$

The parameter $\delta$ is a user selected transition-time threshold. For example, $\delta = 0.15$. In other words, when $\Delta_p < \delta$ the estimated problem start time $t_k$ is set equal to the transition time $T_t$. Otherwise, when $\Delta_p \geq \delta$ the estimated problem start time $t_k$ is set equal to an adjusted-transition time $t_p$.

Figure 7B:
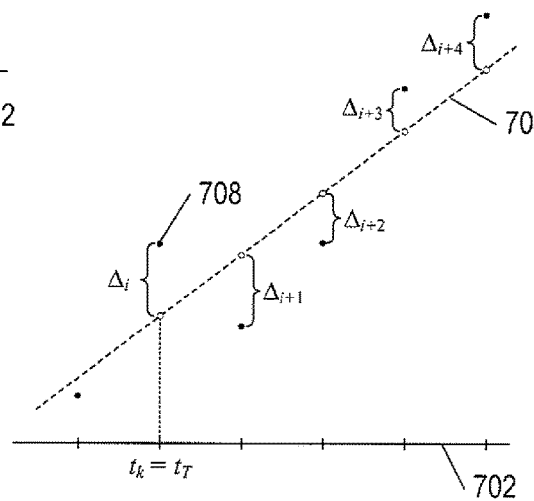
FIG. 7B shows a plot of vertical distances to a least-squares line calculated for the anomaly score data shown in FIG. 7A.
Figure 7C:
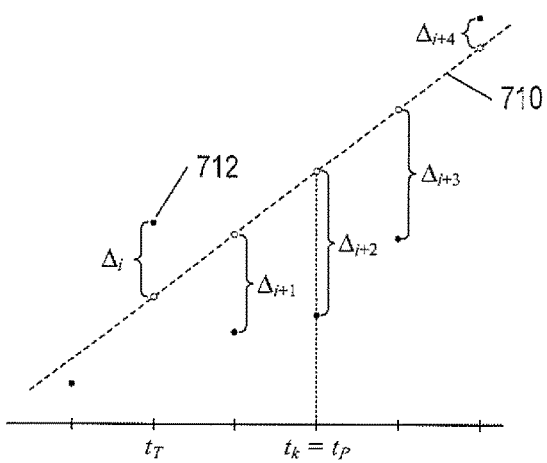
FIG. 7C shows a plot of vertical distance to a least-squares line fit to a set of positively sloped anomaly score data in a time window.

FIG. 7B show a plot of vertical distances the anomaly score data from the weighted least-squares line 704 shown in FIG. 7A. The vertical distances for $i \geq T$ are represented by $\Delta_i$. In this example, all of the vertical distances are less then 0.15. Thus, according to Equation (10), the estimated problem start time $t_k$ is set equal to the transition time $t_T$. FIG. 7C shows a plot of vertical distances for a different set of anomaly score data from a weighted least-squares line 710. Dot 712 represents an anomaly score data point $(t_i, y_i)$ in which $y(t_i)$ is less than $y_{i-1}$. In this example, $\Delta_p = \Delta_{i+2} = |y(t_{i+2}) - y_{i+2}| \geq 0.15$. According to Equation (10), rather than setting the estimated problem start time $t_k$ equal to the transition time $t_T$, the estimated problem start time $t_k$ is set equal to the adjusted-transition time $t_p$ associated with the largest vertical distance between the anomaly data score points and the weighted least-squares line (i.e., $t_k = t_p$).

Figure 8A:
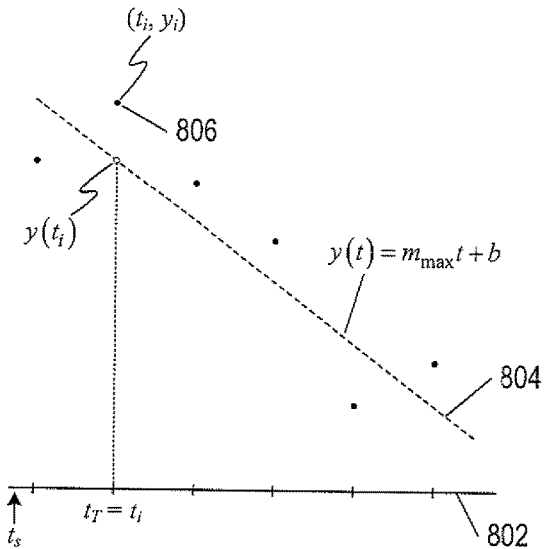
FIG. 8A shows a plot of anomaly score data with a negative slope in a time window.
Figure 8B:
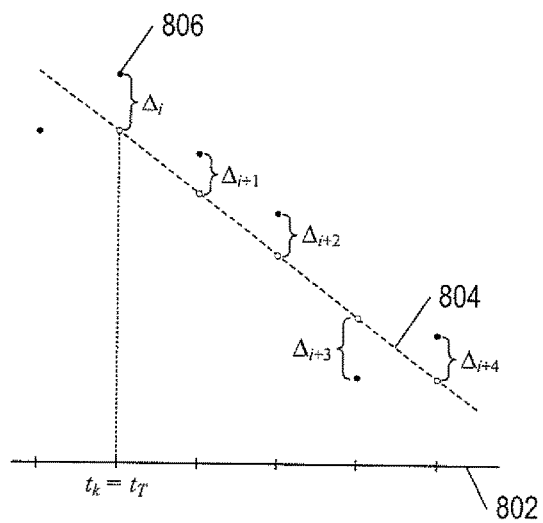
FIG. 8B shows a plot of vertical distances to a least-squares line calculated for the anomaly score data shown in FIG. 8A.
Figure 8C:
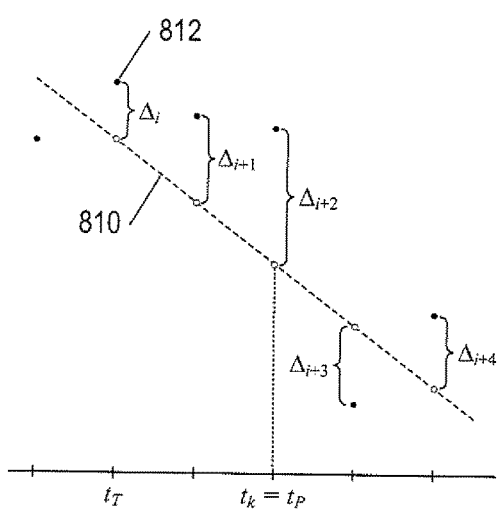
FIG. 8C shows a plot of vertical distance to a least-squares line fit to a set of negatively sloped anomaly score data in a time window.

Equations (8)-(10) may also be used to calculate the estimated problem start time for negatively sloped anomaly score data. FIG. 8A shows a plot of anomaly score data close to the reset minimum $t_s$ of either a backward or forward time window with the maximum slope $m_{max}$. Horizontal axis 802 represents time. Dashed line 804 represents a weighted least-squares fit line to the anomaly score data with slope $m_{max}$ and y-intercept b. Dot 806 represents an anomaly score data point $(t_i, y_i)$ in which $y(t_i)$ is greater than $y_i$ for a minimum time $t_i$. According to Equation (8), the transition time $t_T$ is set equal to the time $t_i$. FIG. 8B show plots of vertical distances calculated for the anomaly score data shown in FIG. 8A. In FIG. 8B, the vertical distances $\Delta_i$ for $i \geq T$ are indicated. In this example, all of the vertical distances are less then 0.15. Thus, according to Equation (10), the estimated problem start time $t_k$ is set equal to the transition time $t_T$. FIG. 8C shows a plot of vertical distances calculated for a different set of anomaly score data from a weighted least-squares line 810. Dot 812 represents an anomaly score data point $(t_i, y_i)$ in which $y(t_i)$ is less than $y_i$. In this example, $\Delta_p = \Delta_{i+2} = |y(t_{i+2}) - y_{i+2}| \geq \delta$. According to Equation (10), the estimated problem start time $t_k$ is set equal to the adjusted-transition time $t_p$.

Figure 9:
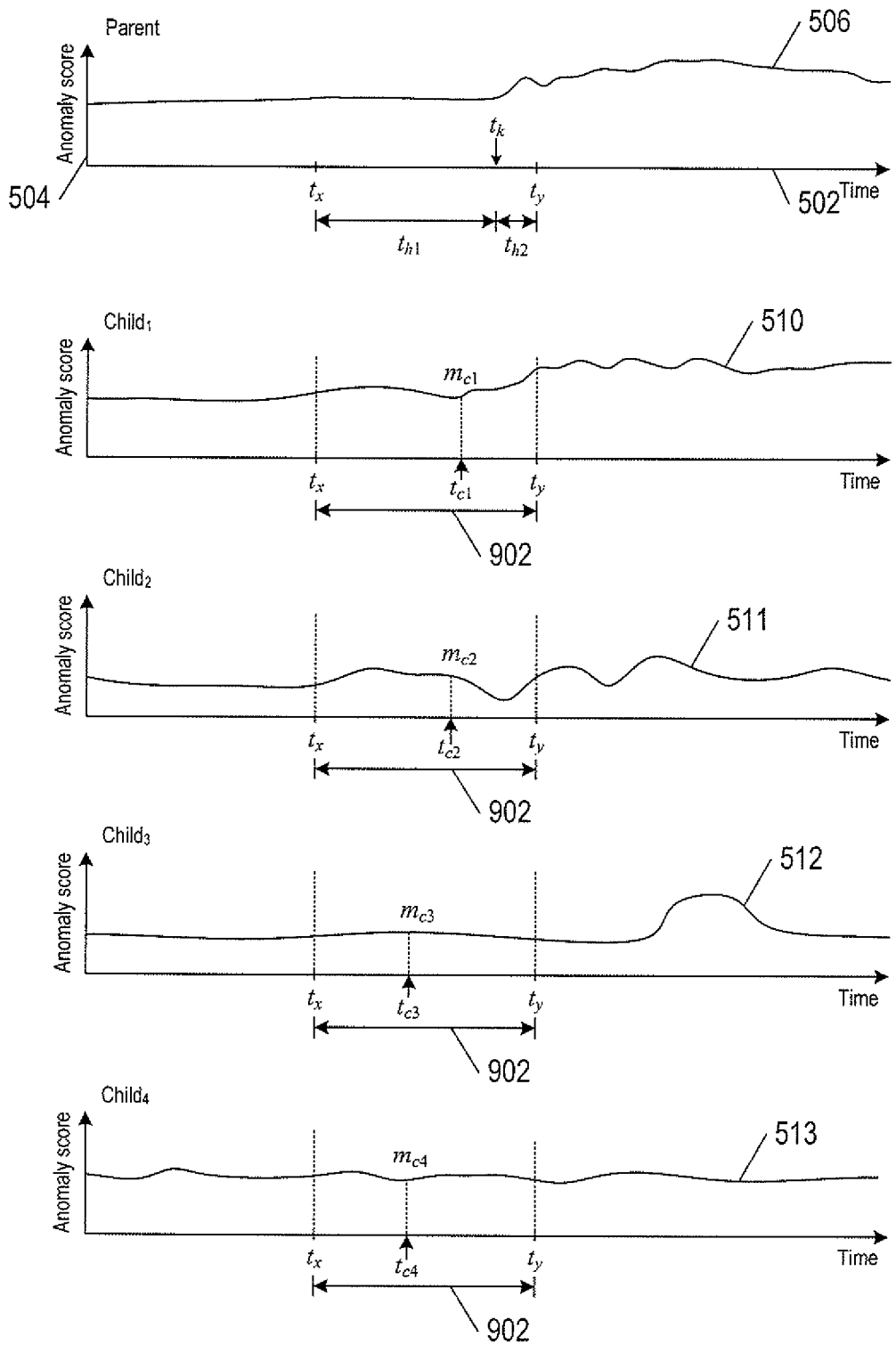
FIG. 9 show plots of the anomaly score data for the parent and children and anomaly score data in target time window.

The estimated problem start time $t_k$ of the parent is used to create a target time window that, in turn, may be used to calculate maximum slopes and estimate problem start time for the children running on the parent. FIG. 9 show plots of the anomaly scores for the parent and four children described above with reference to FIG. 5. An estimated problem start time $t_k$ of the parent is identified on time axis 502. A target time window that includes the estimated problem start time is given by:

$$[t_x, t_y] = [t_k - t_{h1}, t_k + t_{h2}] \qquad (11)$$

A large target time window time range is used to capture estimated problem start time for the children. The time $t_{h1}$ is typically much larger than the time $t_{22}$ in order to try and determine if the estimated problem start time for problems associated with the children that start much earlier than the estimated problem start time $t_k$ for the parent. For example, the time $t_{h1}$ may be about 3 hours and the time $t_{h2}$ may be about 0.5 hours in order to create a target time window with a three and half hour time range that captures estimated problem start times for the children.

Using the target time window given by Equation (11), a maximum slope and estimated problem start time i are calculated for each set of anomaly score data of the children that lie within the target time window as described above. The anomaly scores that lie within the target time window for each child are used to calculate an associated maximum slope, denoted by $m_{ci}$, and estimated child start time, denoted by $t_{ci}$, where the subscript i is the child index.

FIG. 9 shows the target time window 902 along the time axis of each of the children. For Child$_1$, the anomaly score data 904 that lies within the target time window 902 is used to calculate a maximum slope, $m_{c1}$, as described above with reference to FIGS. 6A-6E and Equations (1)-(7). The maximum slope and associated y-intercept are then used to calculate an estimated problem start time $t_{c1}$, as described above with reference to FIGS. 7 and 8 and Equations (8)-(10).

Based on the maximum slope for the parent, $m_{max}$, and the maximum slopes associated with children, $m_{ci}$, recommendation lists of the children are created according to the following rules. A set of children with estimated problem start times that are less than the parent start time is created:

$$B = \{Child_i; \text{ for all } i: t_{ci} < t_k\} \qquad (12)$$

The children in the set B are then sorted into data buckets as follows:

$$R_1 = \left\{ B: \left( \frac{m_{ci}}{m_{max}} \geq 1.0 \right) \text{ or } m_{ci} \geq 0.0083 \right\} \qquad (13a)$$

$$R_2 = \left\{ B: \left( \frac{m_{ci}}{m_{max}} \leq -1.0 \right) \text{ or } m_{ci} \leq 0.0083 \right\} \qquad (13b)$$

$$R_3 = \left\{ B: 0.80 < \frac{m_{ci}}{m_{max}} < 1.0 \right\} \text{ and} \qquad (13c)$$

$$R_4 = \left\{ B: 0.80 \geq \frac{m_{ci}}{m_{max}} > -1.0 \right\} \qquad (13d)$$

In certain embodiments, the children in each data bucket may be sorted from smallest to largest.

The separate data buckets indicate which children are the strongest contributors to the anomalous behavior exhibited by the parent. For example, children in the data buckets $R_1$ and $R_2$ are larger contributors to the anomalous behavior at the parent than are children in the data buckets $R_3$ and $R_4$. The children within each data bucket may also be ranked from largest to smallest based on estimated problem start times and/or based on the ratio of slopes $m_{ci}/m_{max}$. The larger the magnitude of the ratio of slopes, $|m_{ci}/m_{max}|$, the higher the probability that the ith child is a root cause of the anomalous behavior at the parent. The data buckets may then be displayed, such on a computer monitor, so that a systems administrator may examine the children identified in each data bucket, each child's estimated problem start times, and each child ratio of slopes in order to determine which child is or children are, most likely responsible for the anomalous behavior at the parent. Thresholds may also be used to identify which children are most likely responsible for the anomalous behavior at the parent. For example, when the ratio $|m_{ci}/m_{max}|$ is greater than a threshold $T_R$, where the threshold is used as an indication that the ith child is most likely a contributor to, or responsible for, the anomalous behavior at the parent.

For each pair of children of the parent, a correlation coefficient may be calculated from anomaly score data with times between the estimate problem start time of the parent $t_k$ and the alert time $t_a$ as follows:

$$\rho = \frac{1}{M}\sum_{m=1}^{M}\left(\frac{X_m - \mu_X}{\sigma_X}\right)\left(\frac{Y_m - \mu_Y}{\sigma_Y}\right) \quad (14)$$

where $X_m$ and $Y_m$ are anomaly scores of a first child and a second child in the time interval $[t_k, t_a]$;

$\mu_x$ and $\mu_y$ are the mean values of the anomaly scores of the first child and the second child in the time interval $[t_k, t_a]$; and $\sigma_x$ and $\sigma_y$ are the standard deviations of the anomaly scores of the first child and the second child in the time interval $[t_k, t_a]$.

Figure 10:
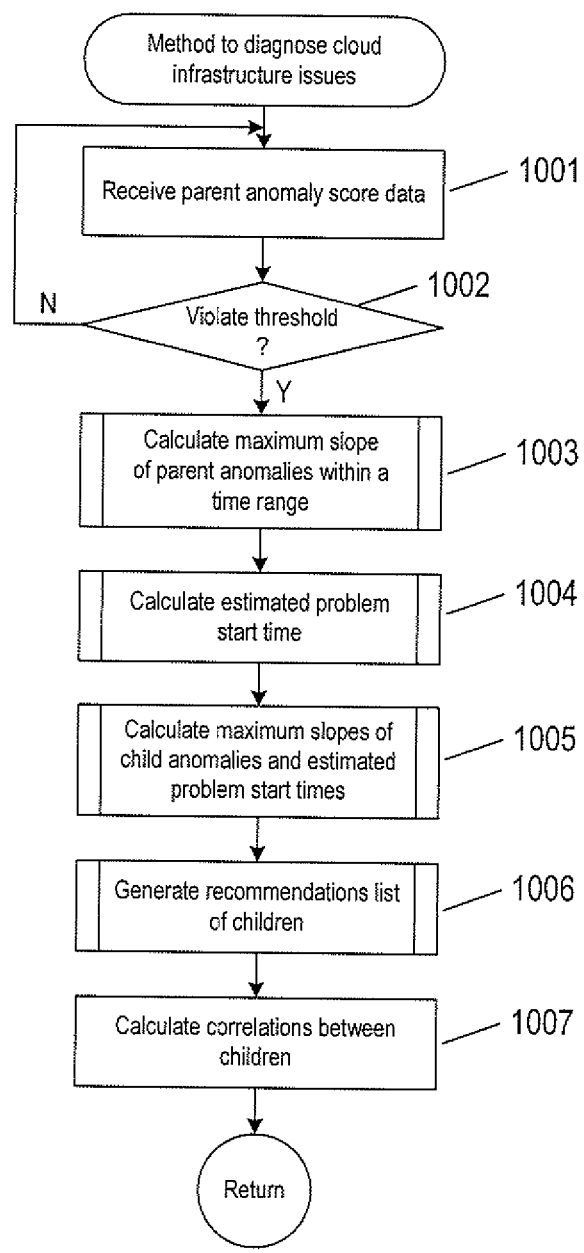
FIG. 10 shows a control-flow diagram of a method to diagnose anomalies in a cloud infrastructure.

FIG. 10 shows a control-flow diagram of a method to diagnose anomalies in a cloud infrastructure. In block 1001, parent anomaly score data is received as described above with reference to FIG. 5. The parent may be a server computer or a host that runs in the cloud infrastructure. In decision block 1002, when an anomaly-score threshold is violated, an alert time $t_a$ is recorded and control flows to block 1003. In block 1003, a routine "calculate maximum slope of parent anomalies within a time range" is called. The time range extends backward in time from the alert time as described above with reference to FIG. 6A. In block 1004, a routine "calculate estimated problem start time" is called to calculate an estimated problem start time within the time range based on the slope. In block 1005, a routine "calculate maximum slopes of child anomalies and estimated problems start times" is called to calculate the maximum slopes of child anomalies and estimated problem start times of the children associated with the parent based on the estimated problem start time of the parent. The children may be VMs, DSs, and resource pools. In block 1006, a routine "generate recommendations list of children" is called to generate recommendation lists of the children based on the maximum slope of the parent and the maximum slopes of the children. In block 1007, for each pair of children of the parent, a correlation coefficient is calculated from anomaly score data of the children recorded between the estimate problem start time of the parent and the alert time $t_a$, as described above with reference to Equation (14).

Figure 11:
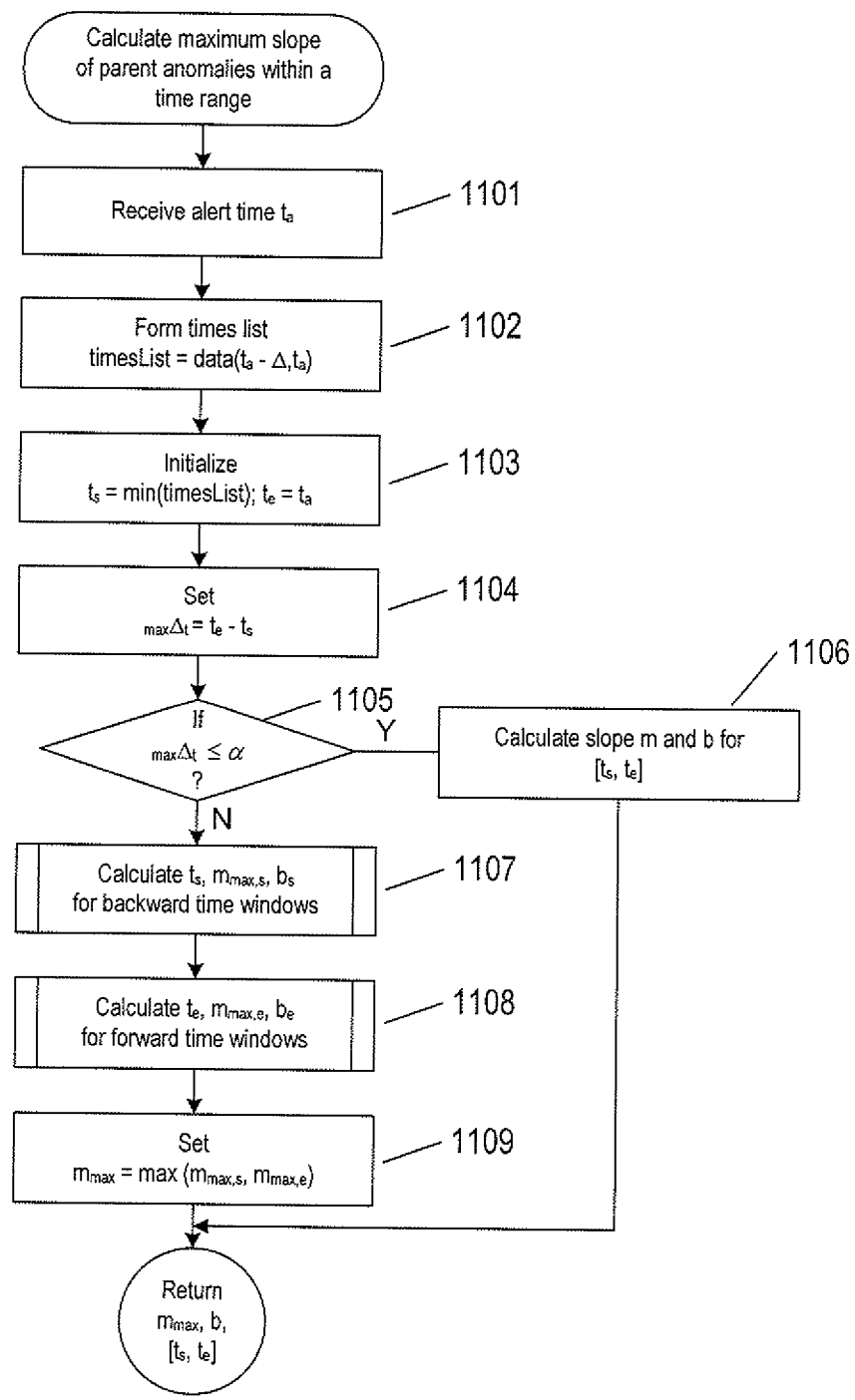
FIG. 11 shows a control-flow diagram of a method "calculate maximum slope of parent anomalies within a time range" called in FIG. 10.

FIG. 11 shows a control-flow diagram of a method "calculate maximum slope of parent anomalies within a time range" called in block 1003 of FIG. 10. In block 1101, the alert time $t_a$ is received. In block 1102, the time range is $[t_a-\Delta, t_a]$ is created. In block 1103, a time list is formed from the anomaly scores recorded in the time range, as described above with reference to Equation (1) and FIG. 6B. In block 1103, a minimum time $t_s$ is initialized as the minimum time of the times in the time list and a maximum time $t_e$ is set equal to the alert time $t_a$, as described above with reference to Equation (2). In block 1104, a maximum time window is formed as the difference between the minimum time $t_s$ and the maximum time $t_e$ of the time list, as described above with reference to Equation (2). In decision block 1105, when the duration of the maximum time window, $_{max}\Delta_t$, is less than a user selected parameter $\alpha$, control flows to block 1106, otherwise, control flows to block 1107. For example, in certain embodiments, the parameter $\alpha$ may be set to about 75 minutes. In block 1106, the maximum slope and y-intercept for parent anomaly score data in $[t_s, t_e]$ is calculated as described above with reference to Equations (4)-(6). In block 1107, a routine "calculate $t_s$, $m_{max,s}$, $b_s$ for backward time windows" is called to calculate maximum slope and y-intercept of the parent anomaly score data in a series of overlapping backward time windows of the maximum time window, as described above with reference to FIG. 6C. In block 1108, a routine "calculate $t_e$, $m_{max,e}$, $b_e$ for forward time windows" is called to calculate maximum slope and y-intercept of the parent anomaly score data in a series of overlapping forward time windows of the maximum time window, as described above with reference to FIG. 6D. In block 1109, the maximum slope and y-intercept of the parent anomaly score data is set equal to the larger of the maximum slopes and y-intercept of the backward and forward time windows determined in blocks 1107 and 1108, as described above with reference to Equation (7).

Figure 12:
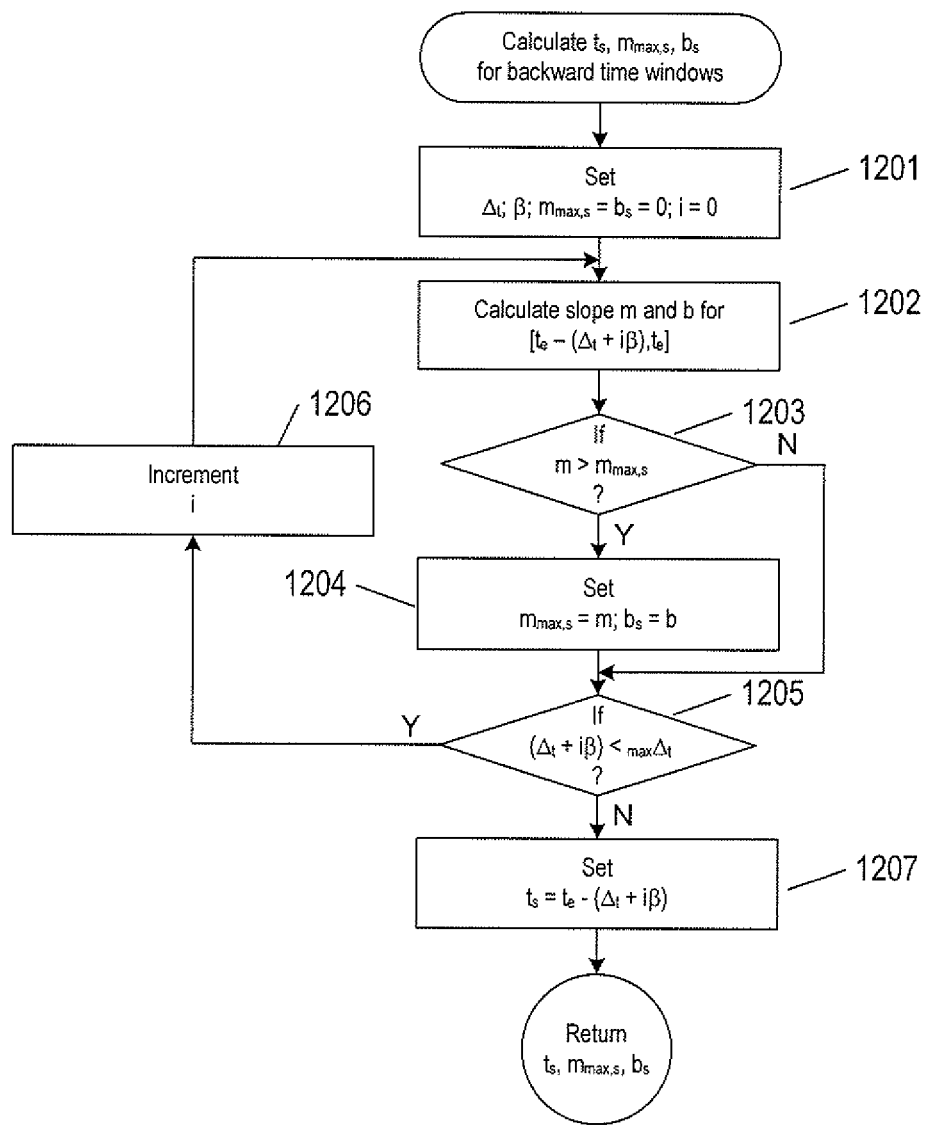
FIG. 12 shows a control-flow diagram of the routine "calculate $t_s$, $m_{max,s}$, $b_s$ for backward time windows" called in FIG. 11.

FIG. 12 shows a control-flow diagram of the routine "calculate $t_s$, $m_{max,s}$, $b_s$ for backward time windows" called in block 1107 of FIG. 11. In block 1201, the parameters $\Delta_t$ and $\beta$ are initialized. For example, the initial time window duration $\Delta_t$ may be set of about 60 minutes and the time window adjustment parameter $\beta$ may be set to about 15 minutes. A maximum slope $m_{max,s}$ and corresponding y-intercept $b_s$ of the backward time window and the index i are initialized to zero. In block 1202, a slope m and y-intercept b are calculated according to Equations (4)-(6) for parent anomaly data in the backward time window $[t_l, t_e]$, where the lower time limit $t_l$ of the backward time window is calculated as described above with reference to Equation (3a). In decision block 1203, if the slope m calculated in block 1202 is greater than the slope $m_{max,s}$, control flows block 1204, otherwise, control flows to decision block 1205. In block 1204, the maximum slope $m_{max,s}$ of the backward time interval is set equal to m and the y-intercept $b_s$ is set equal to the y-intercept b. In decision block 1205, as long as the parameter $(\Delta_t+i\beta)$ is less than the duration of the maximum time window, $_{max}\Delta$, control flows to block 1206 in which the index i is incremented. In block 1207, the minimum time $t_s$ is set equal to the lower time limit $t_l$ of the backward time window with the largest slope.

Figure 13:
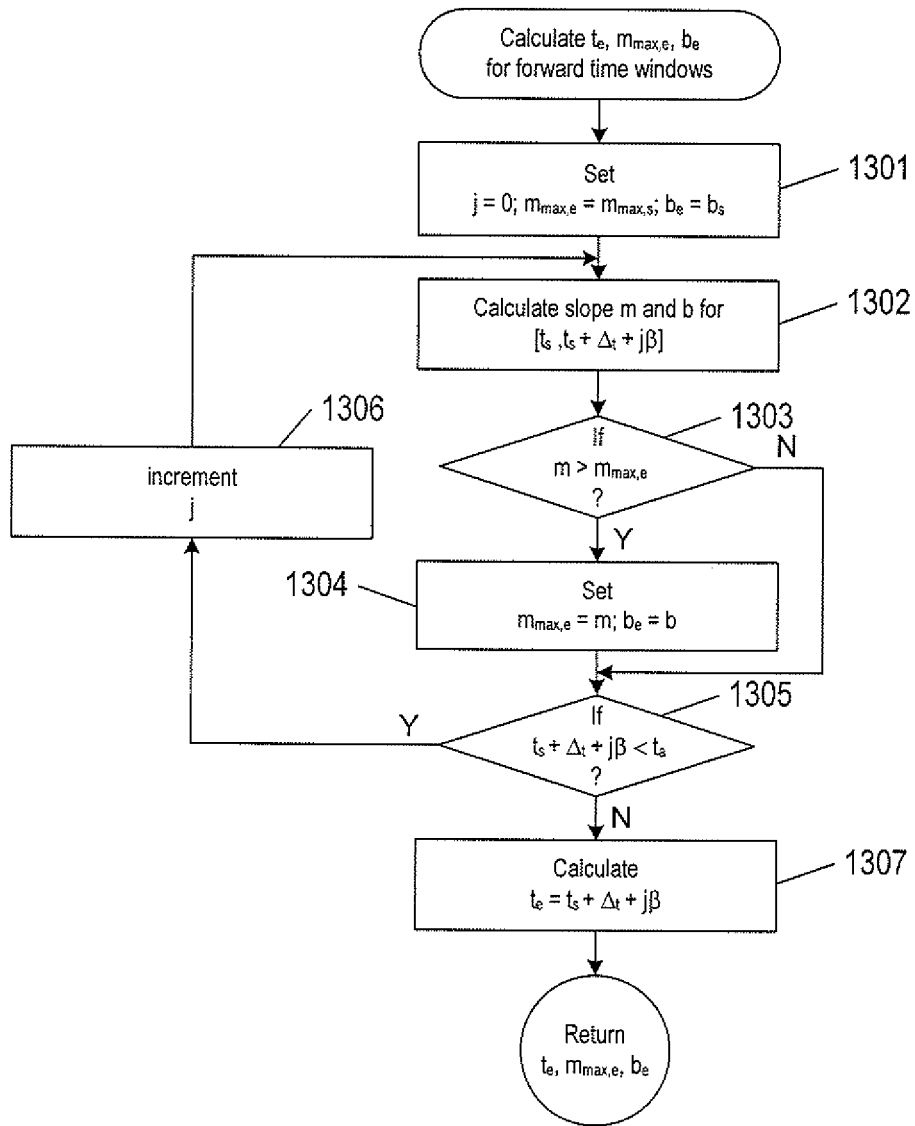
FIG. 13 shows a control-flow diagram of the routine "calculate $t_e$, $m_{max,e}$, $b_e$ for forward time windows" called FIG. 11.

FIG. 13 shows a control-flow diagram of the routine "calculate $t_e$, $m_{max,e}$, $b_e$ for forward time windows" called in block 1108 of FIG. 11. In block 1301, a maximum slope $m_{max,e}$ and corresponding y-intercept $b_e$ of the forward time window are initially set equal to the maximum slope $m_{max,s}$ and corresponding y-intercept $b_s$ of the backward time windows and the index j is initialized to zero. The parameters $\Delta_t$ and $\beta$ remain unchanged. In block 1302, a slope m and y-intercept b are calculated according to Equations (4)-(6) for parent anomaly data in the forward time window $[t_s, t_u]$, where the minimum time $t_s$ set in block 1207 of FIG. 12 is used and the upper time limit $t_u$ of the forward time window is calculated as described above with reference to Equation (3b). In decision block 1303, if the slope m calculated in block 1302 is greater than the slope $m_{max,e}$, control flows to block 1304, otherwise, control flows to decision block 1305. In block 1304, the maximum slope $m_{max,e}$ of the forward time windows is set equal to m and the y-intercept $b_e$ is set equal to the y-intercept b. In decision block 1305, as long as the upper time limit $t_u$ is less than the alert time $t_a$ control flows to block 1306 in which the index j is incremented. In block 1307, the maximum time $t_e$ is set equal to the upper time limit $t_u$ of the forward time window with the largest slope.

Figure 14A:
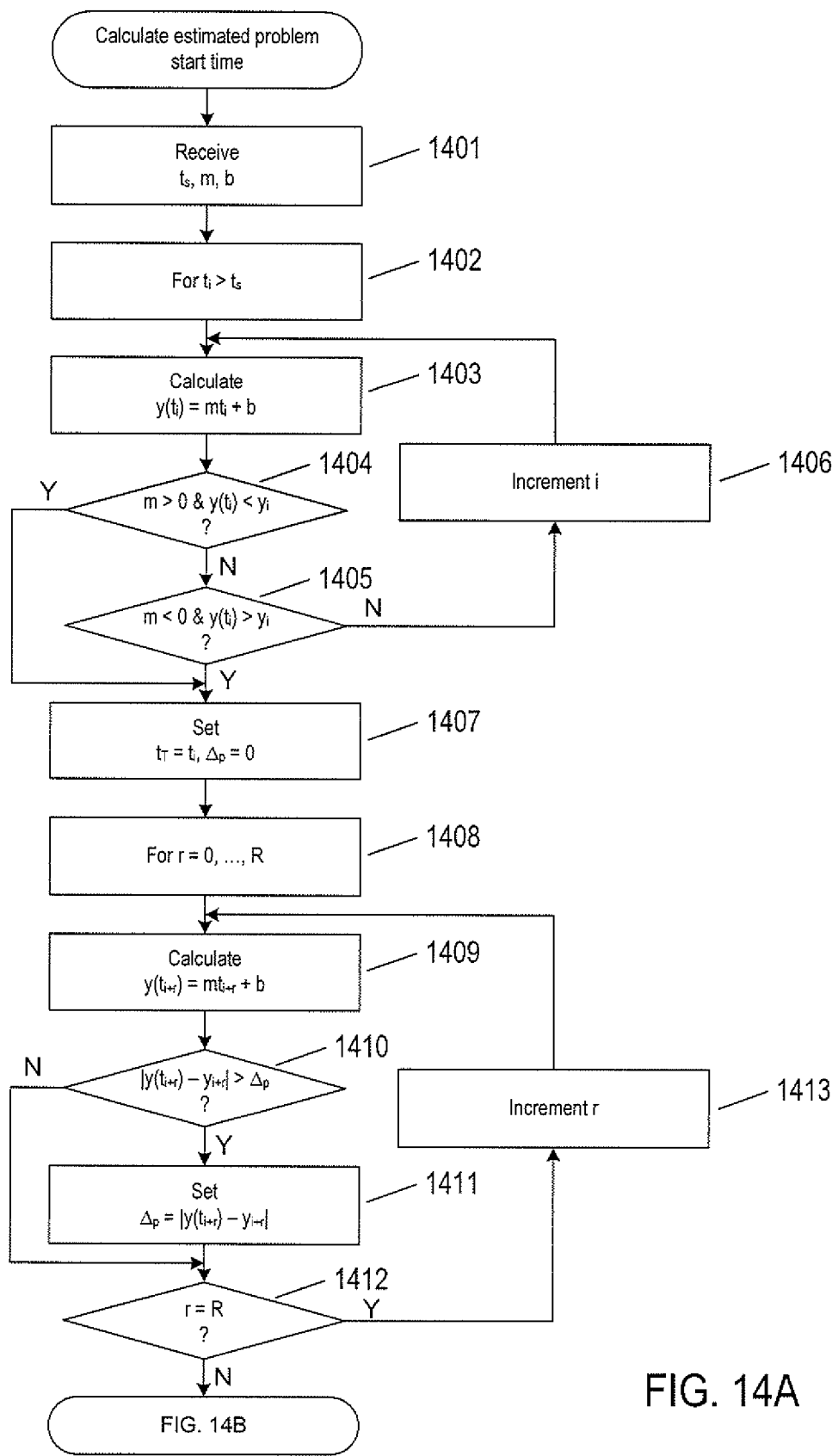
FIG. 14A-B shows a control-flow diagram of the routine "calculate estimated problem start time" called in FIG. 10.

FIG. 14 shows a control-flow diagram of the routine "calculate estimated problem start time" called in block 1004 of FIG. 10. In block 1401, the reset minimum time $t_s$, a slope m and y-intercept b for the weighted least-squares linear equation $y(t_i)=mt_i+b$ are received. A for-loop beginning with block 1402 repeats the operations represented by blocks 1403-1406 for anomaly score times $t_i$ greater than the minimum time $t_s$. In block 1403, the anomaly score value is calculated using the weight least-squares linear equation. In decision block 1404, when the slope m>0 and $y(t_i)<y_i$ control flows to block 1407, otherwise control flows to decision block 1405. In decision block 1405, when the slope m<0 and $y(t_i)>y_i$ control flows to block 1407, otherwise control flows to decision block 1406 and the next anomaly score time $t_i$ is considered. In block 1407, a transition time $t_T$ is set equal to the time $t_i$ and the largest vertical distance $\Delta_p$ between the weighted least-squares line and the anomaly score data is initialized to zero. A for-loop beginning with block 1408, repeats the operations represented by blocks 1409-1412 to determine the largest vertical distance between times greater than the transition time $t_T$ and the weighted least-squares line for R number of anomaly score times. In block 1409, the anomaly score value is calculated using the weight least-squares linear equation. In decision block 1410, when the distance $|y(t_i)-y_i|$ is greater than $\Delta_p$ control flows to block 1411 in which $\Delta_p=|y(t_i)-y_i|$. In decision block 1412, when the index r equals R, control flows to decision block 1414, otherwise control flows to block 1413 and the index r is incremented. In decision block 1414, when the largest vertical distance $\Delta_p<\delta$, control flows to block 1416 and the estimated problem start time $t_k$ is set equal to the transition time $t_T$, as described with reference to FIGS. 7B and 8B. Otherwise, control flows to block 1415 and estimated problem start time $t_k$ is set equal to the adjusted-transition time $t_p$ associated with the largest vertical distance as described above with reference to FIGS. 7C and 8C.

Figures 14B, 15:
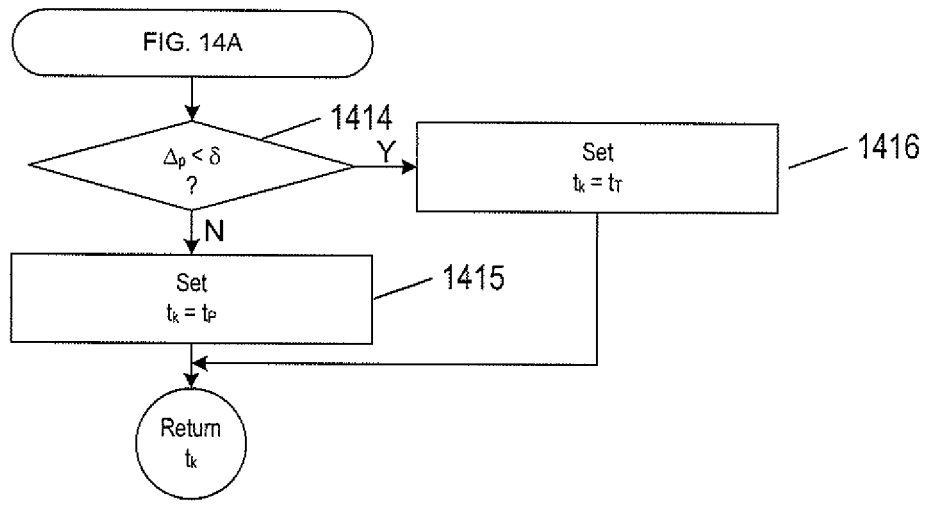
FIG. 15 shows a control-flow diagram of the routine "calculate maximum slopes of child anomalies and estimated problem start times" called in FIG. 10.

FIG. 15 shows a control-flow diagram of the routine "calculate maximum slopes of child anomalies and estimated problem start times" called in block 1005 of FIG. 10. In block 1501, a target time windows is created based on the estimated problem start time $t_k$ as described above with reference to Equation (11). A for-loop beginning with block 1502 repeats the operations represented by blocks 1503 and 1504 for each of the children, where J is the number of children. In block 1503, a routine "calculate maximum slope of anomalies over the target time window" is called. In block 1504, the routine "calculate estimate problem start time" described above with reference to FIGS. 14A-14B is called to calculate the estimated problem start time for the jth child.

Figure 16:
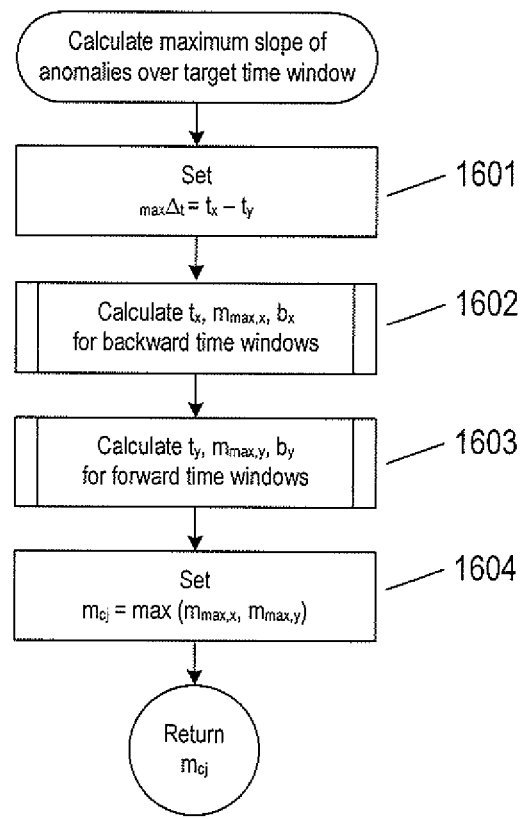
FIG. 16 shows a control-flow diagram of the routine "calculate maximum slope of anomalies over the target time window" called in FIG. 15.

FIG. 16 shows a control-flow diagram of the routine "calculate maximum slope of anomalies over the target time window" called in block 1503 of FIG. 15. In block 1601, the parameter $_{max}\Delta_t$ is set equal to the length of the target time window. In block 1602, the routine "calculate $t_x$, $m_{max,x}$, $b_x$ for backward time windows" is called to calculate maximum slope and y-intercept of the jth child anomaly score data in a series of overlapping backward time windows as described above with reference to FIG. 12. In block 1108, the routine "calculate $t_y$, $m_{max,y}$, $b_y$ for forward time windows" is called to calculate maximum slope and y-intercept of the jth child anomaly score data in a series of overlapping forward time windows, as described above with reference to FIG. 13. In block 1604, the maximum slope $m_{cj}$ of the jth child is calculated.

Figure 17:
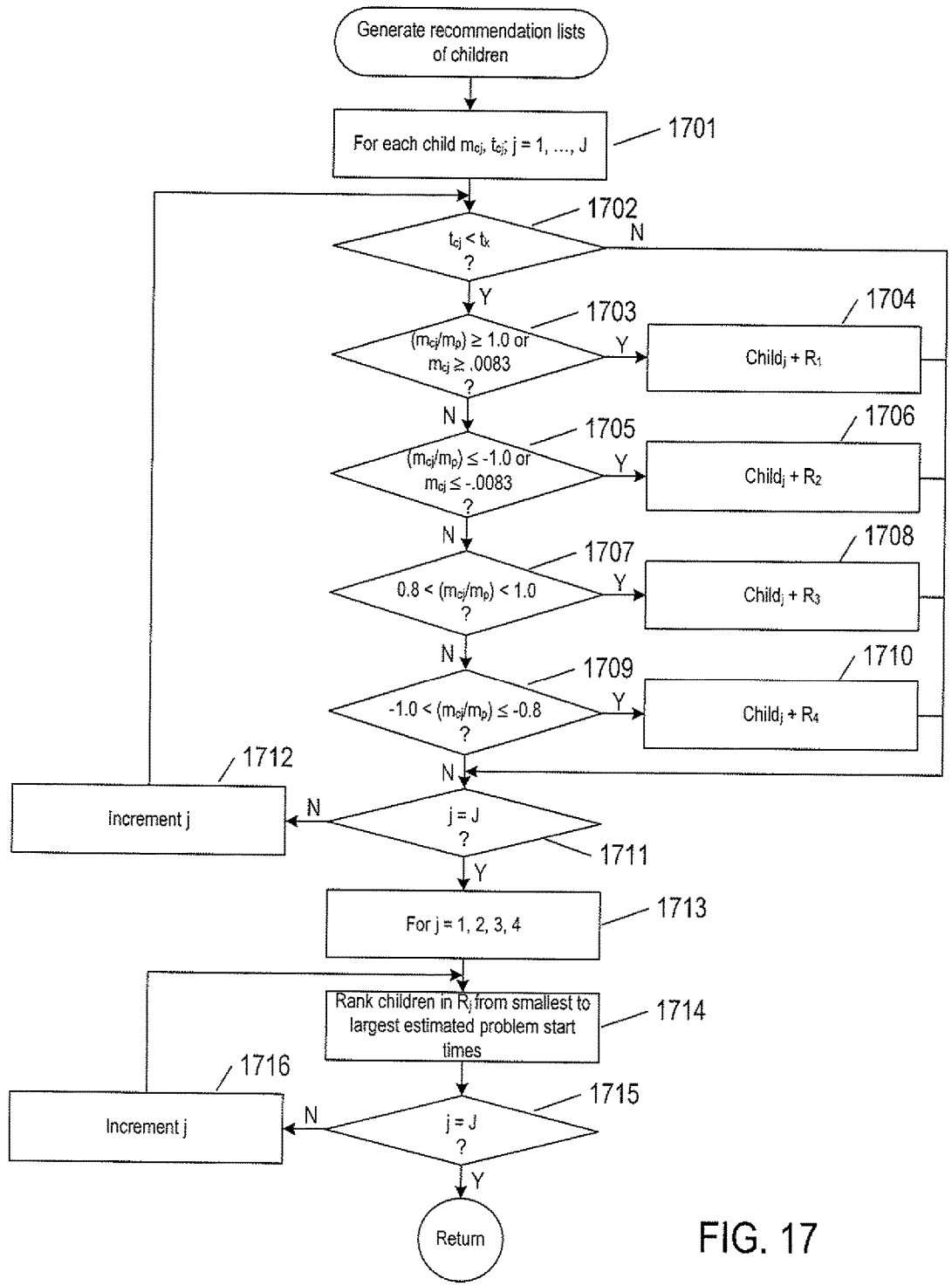
FIG. 17 shows a control-flow diagram of the routine "generate recommendations list of children" called in FIG. 10.

FIG. 17 shows a control-flow diagram of the routine "generate recommendations list of children" called in block 1006. A for-loop beginning with block 1701 repeats the operations represented by blocks 1702-1712 for each child. In block 1702, when the estimated problem start time $t_{cj}$ of the jth child is less than the estimated problem start time $t_k$ of the parent, control flows to decision blocks 1703. Decision blocks 1703, 1705, 1707, and 1709 separate the children into the data buckets $R_1$, $R_2$, $R_3$, and $R_4$, as described above with reference to Equations (13a)-(13d), respectively. In blocks 1704, 1706, 1708, and 1710, the children separated in decision blocks 1703, 1705, 1707, and 1709 are added to data buckets $R_1$, $R_2$, $R_3$, and $R_4$, respectively. In block 1711, when j is less than J, the operations of blocks 1702-1710 are repeated. Otherwise, control flows to block 1713 in which a for-loop repeats the operation of sorting children in each of the data buckets $R_1$, $R_2$, $R_3$, and $R_4$ from the smallest to largest estimated problem start times.

Figure 18:
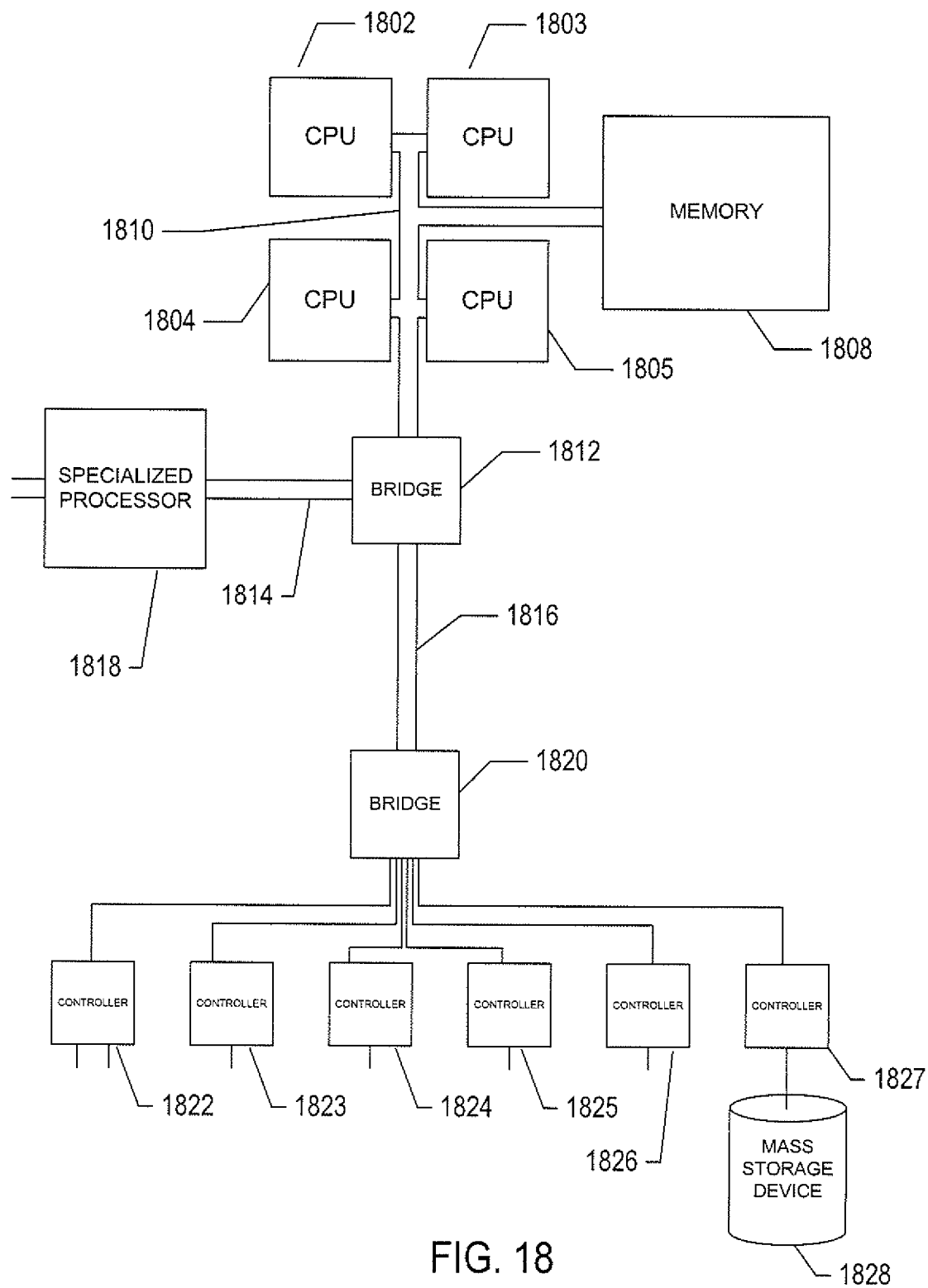
FIG. 18 shows an architectural diagram for various types of computers.

FIG. 18 shows a general architectural diagram for various types of computers used to execute the methods described above. The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. These busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of mass-storage devices 1828, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Figure 19A:
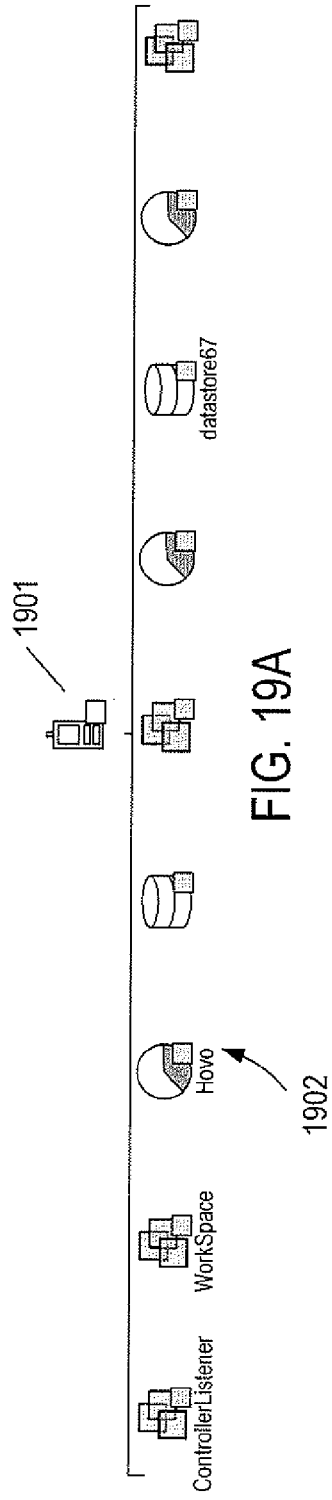
Figure 19B:
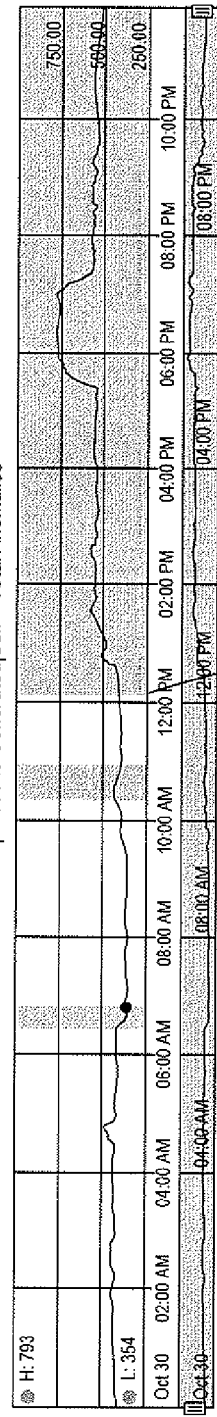
Figure 19C:
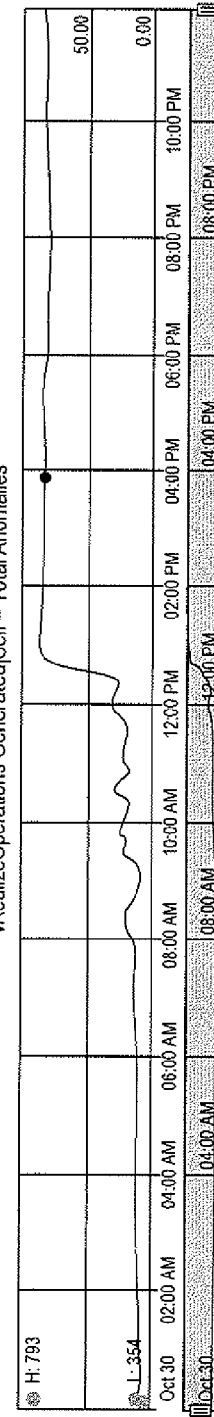
Figure 19D:
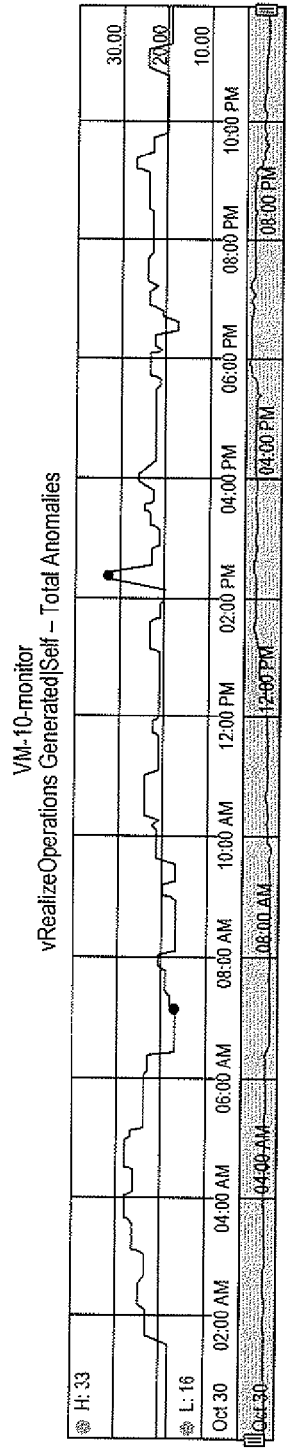
Figure 19E:
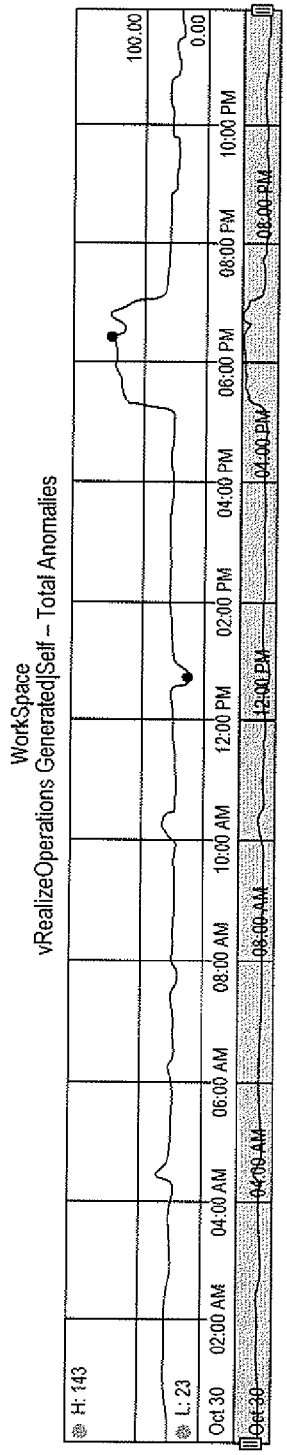
Figure 19F:
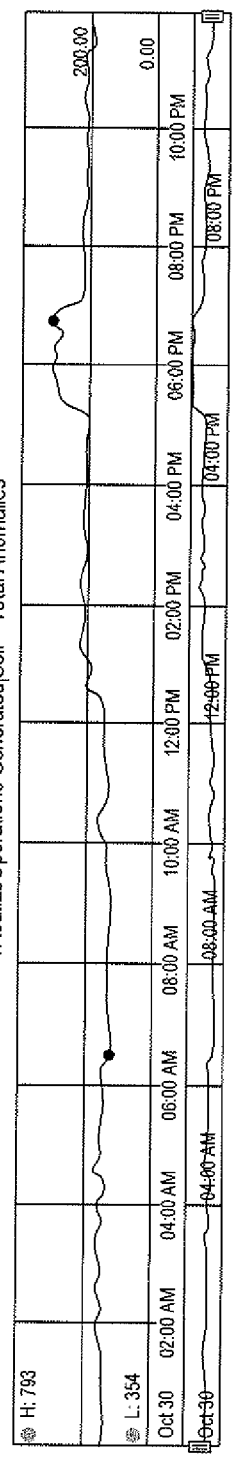

FIGS. 19A-19L show experimental results. FIG. 19A shows a diagram of a parent ESX host 1901 and children 1902 (VM's, datastore, resource pool). FIG. 19B shows a total anomaly score of the host with an alert generated at 12:09 PM 1903. Executing the above described method at 12:20 PM 1904 identifies the problem start time and a recommendation list of children in FIGS. 19C-19F, with R representing object's rank (not normalized). FIG. 19C shows that the first child VM (ControllerListener) experienced the highest rate of anomalies increase during the problem evolution after 12:00 PM. Table I in FIG. 19F shows that for the same problematic time window, the children metrics are correlated using to correlation coefficient of Equation (14) to observe how the impact is propagated over the peers. Table 1 reveals that the most highly correlated children are in a resource pool formed from the first three entries, as shown in FIG. 19G. Table II in FIG. 19I shows the historic correlations of total metrics of the children. Table II reveals that VC-10-monitor gives a high correlation with the parent resource pool "Hovo," compared to the run-time results displayed in Table I. As a result, from a historical perspective, the anomaly status of the resource pool "Hovo" is mostly associated with one child, which is the VC-10-monitor.

Figure 19J:
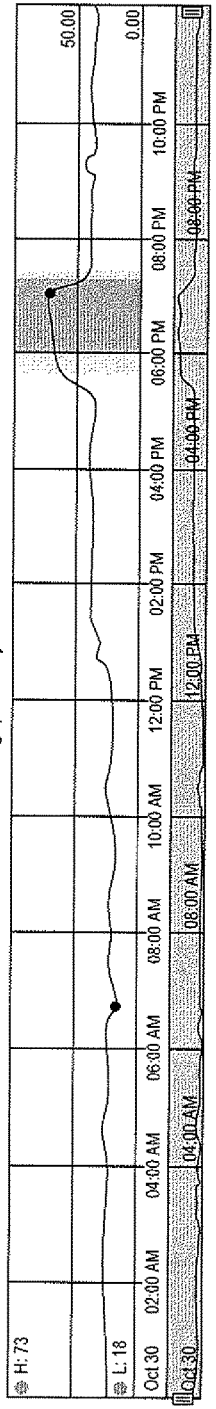
Figure 19K:
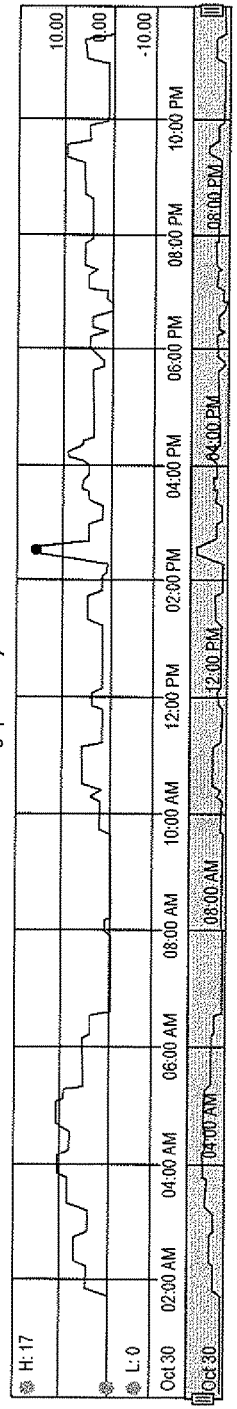
Figure 19L:
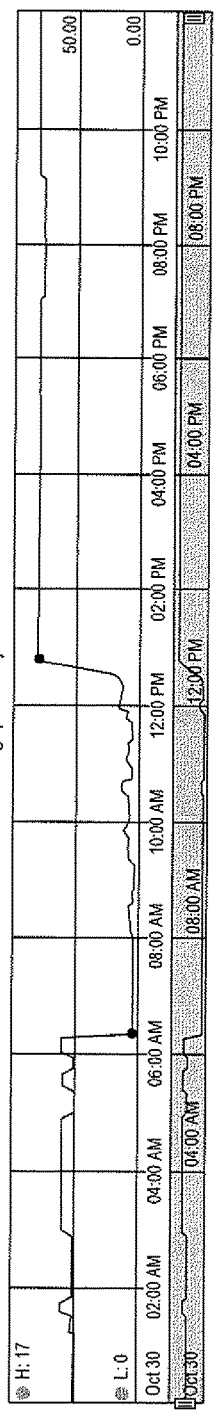

In these experiments, positive correlations dominate in correlation matrices. In other words, in an IT environment, the problem causes other problems, or at least does not eliminate existing ones. Similar peer-to-peer correlation may be performed for hosts within the same cluster. The host was followed and observed for about 6 hours after the alert (which was still active). The host's "Badge|Anomaly" metric was increased, as shown in FIG. 19J, which indicates the host experienced an additional performance problem. FIG. 19J shows the status changed to critical at about 06:00 PM. The methods described above were then executed for the total anomaly score and the Badge|Anomaly again, which identified only one recommended child as contributing to those metrics in both cases. The problem interval detected by the method was Oct. 30, 2015 14:02:23 PM-Oct. 30, 2015 17:32:23 PM for both anomaly metrics. VC-10-Monitor represented in FIG. 19K had rank scores of R=37.97 and R=4.05, respectively. Based on the four recommended children for the alert, only the VC-10-Monitor continued to contributing to the problem. Moreover, the VC-10-Monitor was responsible for the problem of Badge|Anomaly that indicated out-of-normal performance of a significant portion of child metrics. FIG. 19L shows the highest rank object ControllerListener stabilized.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. In a process to diagnose anomalies in a cloud infrastructure in which computers and virtual resources of the cloud infrastructure generate metric data stored in one or more data-storage devices, the specific improvement comprising:
    calculating anomaly score data of a computer running one or more virtual resource in the cloud infrastructure based on the metric data generated by the computer;
    calculating a maximum slope of anomaly score data of the computer within a time range that extends backward in time from an alert time that indicates when an anomaly score of the computer exceeds a threshold;
    calculating an estimated problem start time based on the maximum slope, the estimated problem start time identifies an approximate time when anomalous behavior with the computer began;
    calculating a maximum slope of anomaly score data and estimated problems start times for each of the one or more virtual resources running on the computer based on the estimated problem start time of the computer;
    generating a recommendation list of virtual resources that likely cause anomalous behavior at the computer based on ratios of the maximum slope of anomaly score data associated with each of the one or more virtual resources and the maximum slope of anomaly score data associate with the computer; and
    moving one or more virtual resources identified as the likely cause of anomalous behavior at the computer to different computers in the cloud infrastructure, thereby increasing efficient use of the computer.

2. The process of claim 1, wherein calculating the maximum slope of computer anomaly score data within the time range further comprises:
    calculating a maximum slope and y-intercept of the computer anomaly score data in a series of overlapping backward time windows within the time range;
    calculating a maximum slope and y-intercept of the computer anomaly score data in a series of overlapping forward time windows within the time range; and
    setting the maximum slope and y-intercept of the computer anomaly score data equal to the larger of the maximum slopes and y-intercepts of the backward and forward time windows.

3. The process of claim 2, calculating the maximum slope and y-intercept of the computer anomaly score data in the series of backward time windows further comprises:
    rescaling the anomaly score data in a backward time window to a common reference frame;
    calculating a slope and a y-intercept for a weighted least-squares fit of a line to the anomaly score data in the backward time window;
    decreasing a lower time limit of the backward time window to generate a backward time window with a longer duration;
    repeating rescaling, calculating, and decreasing until the duration of the backward time window exceeds a minimum time limit of the time range; and
    identifying a maximum slope of the slopes calculated for the series of backward time windows.

4. The process of claim 2, calculating the maximum slope and y-intercept of the computer anomaly score data in the series of forward time windows further comprises:
    rescaling the anomaly score data in a forward time window to a common reference frame;

calculating a slope and a y-intercept for a weighted least-squares fit of a line to the anomaly score data in the forward time window;

increasing an upper time limit of the forward time window to generate a forward time window with a longer duration;

repeating rescaling, calculating, and decreasing until the duration of the forward time window exceeds a maximum time limit of the time range; and identifying a maximum slope of the slopes calculated for the series of forward time windows.

5. The process of claim 1, wherein calculating the estimated problem start time based on the maximum slope further comprises determining a transition time.

6. The process of claim 5, determining the transition time further comprises:

settting the estimated problem start time equal to the transition time when vertical distances between anomaly score data and a least squares line fit to the anomaly score data is less than a transition-time threshold; and setting the estimated problem start time equal to an adjusted-transition time when vertical distances between anomaly score data and a least squares line fit to the anomaly score data is greater than a transition-time threshold.

7. The process of claim 1, where calculating a maximum slope of anomaly scores and estimated problems start times for each of one or more virtual resources further comprises:

calculating a target time window from the estimated problem start time of the computer;

for each of the one or more virtual resources,
resealing the anomaly score data in a backward time window to a common reference frame;
calculating a slope and a y-intercept for a weighted least-squares fit of a line to the anomaly score data in the backward time window;
decreasing a lower time limit of the backward time window to generate a backward time window with a longer duration;
repeating resealing, calculating, and decreasing until the duration of the backward time window exceeds a minimum time limit of the target time window; and
identifying a maximum slope of the slopes calculated for the series of backward time windows.

8. The process of claim 7 further comprises:

rescaling the anomaly score data in a forward time window to a common reference frame;

calculating a slope and a y-intercept for a weighted least-squares fit of a line to the anomaly score data in a forward time window;

increasing an upper time limit of the forward time window to generate a forward time window with a longer duration;

repeating rescaling, calculating, and decreasing until the duration of the forward time window exceeds a maximum time limit of the time range; and identifying a maximum slope of the slopes calculated for the series of forward time windows.

9. The process of claim 1, wherein generating the recommendation lists of virtual resources based on the maximum slope of anomaly scores associated with each of the one or more virtual resources further comprises:

sorting the one or more virtual resources into data buckets based on a ratio of the maximum slope of anomaly scores associated with each virtual resource and the maximum slope of anomaly scores associated with the computer; and within each data bucket, ordering the virtual resources from smallest to largest estimated problem start time.

10. A system to diagnose anomalies in a cloud infrastructure, the system comprising:

one or more processors;

one or more data-storage devices; and machine-readable instructions stored in the one or more data-storage devices that when executed using the one or more processors controls the system to carry out operations comprising:

calculating anomaly score data of a computer running one or more virtual resource in the cloud infrastructure based on the metric data generated by the computer;

calculating a maximum slope of anomaly score data within a time range that extends backward in time from an alert time that indicates when an anomaly score of a computer exceeds a threshold;

calculating an estimated problem start time based on the maximum slope, the estimated problem start time identifies an approximate time when anomalous behavior with the computer began;

calculating a maximum slope of anomaly score data and estimated problems start times for each of the one or more virtual resources running on the computer based on the estimated problem start time of the computer;

generating a recommendation list of virtual resources that likely cause anomalous behavior at the computer based on ratios of the maximum slope of anomaly score data associated with each of the one or more virtual resources and the maximum slope of anomaly score data associate with the computer and;

moving one or more virtual resources identified as the likely cause of anomalous behavior at the computer to different computers in the cloud infrastructure, thereby increasing efficient use of the computer.

11. The system of claim 10, wherein calculating the maximum slope of computer anomaly score data within the time range further comprises:

calculating a maximum slope and y-intercept of the computer anomaly score data in a series of overlapping backward time windows within the time range;

calculating a maximum slope and y-intercept of the computer anomaly score data in a series of overlapping forward time windows within the time range; and setting the maximum slope and y-intercept of the computer anomaly score data equal to the larger of the maximum slopes and y-intercepts of the backward and forward time windows.

12. The system of claim 11, calculating the maximum slope and y-intercept of the computer anomaly score data in the series of backward time windows further comprises:

rescaling the anomaly score data in a backward time window to a common reference frame;

calculating a slope and a y-intercept for a weighted least-squares fit of a line to the anomaly score data in the backward time window;

decreasing a lower time limit of the backward time window to generate a backward time window with a longer duration;

repeating rescaling, calculating, and decreasing until the duration of the backward time window exceeds a minimum time limit of the time range; and identifying a maximum slope of the slopes calculated for the series of backward time windows.

13. The system of claim 11, calculating the maximum slope and y-intercept of the computer anomaly score data in the series of forward time windows further comprises:
rescaling the anomaly score data in a forward time window to a common reference frame;
calculating a slope and a y-intercept for a weighted least-squares fit of a line to the anomaly score data in the forward time window;
increasing an upper time limit of the forward time window to generate a forward time window with a longer duration;
repeating rescaling, calculating, and decreasing until the duration of the forward time window exceeds a maximum time limit of the time range; and
identifying a maximum slope of the slopes calculated for the series of forward time windows.

14. The system of claim 10, wherein calculating the estimated problem start time based on the maximum slope further comprises determining a transition time.

15. The system of claim 14, determining the transition time further comprises:
settting the estimated problem start time equal to the transition time when vertical distances between anomaly score data and a least squares line fit to the anomaly score data is less than a transition-time threshold; and
setting the estimated problem start time equal to an adjusted-transition time when vertical distances between anomaly score data and a least squares line fit to the anomaly score data is greater than a transition-time threshold.

16. The system of claim 10, where calculating a maximum slope of anomaly scores and estimated problems start times for each of one or more virtual resources further comprises:
calculating a target time window from the estimated problem start time of the computer;
for each of the one or more virtual resources,
rescaling the anomaly score data in a backward time window to a common reference frame;
calculating a slope and a y-intercept for a weighted least-squares fit of a line to the anomaly score data in the backward time window;
decreasing a lower time limit of the backward time window to generate a backward time window with a longer duration;
repeating rescaling, calculating, and decreasing until the duration of the backward time window exceeds a minimum time limit of the target time window; and
identifying a maximum slope of the slopes calculated for the series of backward time windows.

17. The system of claim 16 further comprises:
rescaling the anomaly score data in a forward time window to a common reference frame;
calculating a slope and a y-intercept for a weighted least-squares fit of a line to the anomaly score data in a forward time window;
increasing an upper time limit of the forward time window to generate a forward time window with a longer duration;
repeating rescaling, calculating, and decreasing until the duration of the forward time window exceeds a maximum time limit of the time range; and
identifying a maximum slope of the slopes calculated for the series of forward time windows.

18. The system of claim 10, wherein generating the recommendation lists of virtual resources based on the maximum slope of anomaly scores associated with each of the one or more virtual resources further comprises:
sorting the one or more virtual resources into data buckets based on a ratio of the maximum slope of anomaly scores associated with each virtual resource and the maximum slope of anomaly scores associated with the computer; and
within each data bucket, rank ordering the virtual resources from smallest to largest estimated problem start time.

19. A non-transitory computer-readable medium encoded with machine-readable instructions that implement a method carried out by one or more processors of a computer system to perform the operations of comprising:
calculating anomaly score data of a computer running one or more virtual resource in the cloud infrastructure based on the metric data generated by the computer;
calculating a maximum slope of anomaly score data within a time range that extends backward in time from an alert time that indicates when an anomaly score of a computer exceeds a threshold;
calculating an estimated problem start time based on the maximum slope, the estimated problem start time identifies an approximate time when anomalous behavior with the computer began;
calculating a maximum slope of anomaly score data and estimated problems start times for each of the one or more virtual resources running on the computer based on the estimated problem start time of the computer;
generating a recommendation list of virtual resources that likely cause anomalous behavior at the computer based on ratios of the maximum slope of anomaly score data associated with each of the one or more virtual resources and the maximum slope of anomaly score data associate with the computer; and
moving one or more virtual resources identified as the likely cause of anomalous behavior at the computer to different computers in the cloud infrastructure, thereby increasing efficient use of the computer.

20. The medium of claim 19, wherein calculating the maximum slope of computer anomaly score data within the time range further comprises:
calculating a maximum slope and y-intercept of the computer anomaly score data in a series of overlapping backward time windows within the time range;
calculating a maximum slope and y-intercept of the computer anomaly score data in a series of overlapping forward time windows within the time range; and
setting the maximum slope and y-intercept of the computer anomaly score data equal to the larger of the maximum slopes and y-intercepts of the backward and forward time windows.

21. The medium of claim 20, calculating the maximum slope and y-intercept of the computer anomaly score data in the series of backward time windows further comprises:
rescaling the anomaly score data in a backward time window to a common reference frame;
calculating a slope and a y-intercept for a weighted least-squares fit of a line to the anomaly score data in the backward time window;
decreasing a lower time limit of the backward time window to generate a backward time window with a longer duration;

repeating resealing, calculating, and decreasing until the duration of the backward time window exceeds a minimum time limit of the time range; and identifying a maximum slope of the slopes calculated for the series of backward time windows.

22. The medium of claim 20, calculating the maximum slope and y-intercept of the computer anomaly score data in the series of forward time windows further comprises:

resealing the anomaly score data in a forward time window to a common reference frame;

calculating a slope and a y-intercept for a weighted least-squares fit of a line to the anomaly score data in the forward time window;

increasing an upper time limit of the forward time window to generate a forward time window with a longer duration;

repeating resealing, calculating, and decreasing until the duration of the forward time window exceeds a maximum time limit of the time range; and identifying a maximum slope of the slopes calculated for the series of forward time windows.

23. The medium of claim 19, wherein calculating the estimated problem start time based on the maximum slope further comprises determining a transition time.

24. The medium of claim 23, determining the transition time further comprises:

settting the estimated problem start time equal to the transition time when vertical distances between anomaly score data and a least squares line fit to the anomaly score data is less than a transition-time threshold; and setting the estimated problem start time equal to an adjusted-transition time when vertical distances between anomaly score data and a least squares line fit to the anomaly score data is greater than a transition-time threshold.

25. The medium of claim 19, where calculating a maximum slope of anomaly scores and estimated problems start times for each of one or more virtual resources further comprises:

calculating a target time window from the estimated problem start time of the computer;

for each of the one or more virtual resources, resealing the anomaly score data in a backward time window to a common reference frame;

calculating a slope and a y-intercept for a weighted least-squares fit of a line to the anomaly score data in the backward time window;

decreasing a lower time limit of the backward time window to generate a backward time window with a longer duration;

repeating resealing, calculating, and decreasing until the duration of the backward time window exceeds a minimum time limit of the target time window; and identifying a maximum slope of the slopes calculated for the series of backward time windows.

26. The medium of claim 25 further comprises:

resealing the anomaly score data in a forward time window to a common reference frame;

calculating a slope and a y-intercept for a weighted least-squares fit of a line to the anomaly score data in a forward time window;

increasing an upper time limit of the forward time window to generate a forward time window with a longer duration;

repeating resealing, calculating, and decreasing until the duration of the forward time window exceeds a maximum time limit of the time range; and identifying a maximum slope of the slopes calculated for the series of forward time windows.

27. The medium of claim 19, wherein generating the recommendation lists of virtual resources based on the maximum slope of anomaly scores associated with each of the one or more virtual resources further comprises:

sorting the one or more children into data buckets based on a ratio of the maximum slope of anomaly scores associated with each virtual resource and the maximum slope of anomaly scores associated with the computer; and within each data bucket, rank ordering the virtual resources from smallest to largest estimated problem start time.

* * * * *